(12) United States Patent
Tomita

(10) Patent No.: US 6,282,032 B1
(45) Date of Patent: *Aug. 28, 2001

(54) ZOOM LENS

(75) Inventor: Yasuyuki Tomita, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,712

(22) Filed: Oct. 13, 1999

(30) Foreign Application Priority Data

Oct. 14, 1998 (JP) .................................. 10-307868

(51) Int. Cl.[7] .................................. G02B 15/14
(52) U.S. Cl. ............................ 359/687; 359/683
(58) Field of Search ..................... 359/687, 683, 359/676

(56) References Cited

U.S. PATENT DOCUMENTS

| | | | |
|---|---|---|---|
| 5,268,793 | 12/1993 | Saka et al. | 359/690 |
| 5,418,646 | 5/1995 | Shibata et al. | 359/687 |
| 5,748,381 | 5/1998 | Ono | 359/647 |
| 5,751,497 | 5/1998 | Usui et al. | 359/687 |
| 5,790,316 | 8/1998 | Terasawa et al. | 359/687 |
| 6,002,528 | 12/1999 | Tomita | 359/684 |

FOREIGN PATENT DOCUMENTS

| | | |
|---|---|---|
| 6-59191 | 3/1994 | (JP) . |
| 8-82741 | 3/1996 | (JP) . |

OTHER PUBLICATIONS

Patent Abstracts of Japan, vol. 18, No. 295 (P–1748) (JP 6–59191, Mar. 4, 1994), Jun. 6, 1994.

*Primary Examiner*—Scott J. Sugarman
(74) *Attorney, Agent, or Firm*—Fitzpatrick, Cella, Harper & Scinto

(57) ABSTRACT

A zoom lens includes a first lens unit having a positive refracting power and is fixed during zooming, a second lens unit having a negative refracting power and is movable during zooming, a third lens unit having a positive refracting power and used to correct the image surface by the zooming, and a fourth lens unit having a positive refracting power. These lens units are arranged in the order named from the object side. In order to properly correct halo/coma that tends to occur during zooming, an aspherical surface is formed in the third lens unit at a focal length fm given by $fm=fw \cdot z^{1/2}$, where fw is the wide-angle focal length, and z is the zoom ratio, when the imaging magnifications of the second and third lens units simultaneously pass through –1-time point during zooming.

5 Claims, 34 Drawing Sheets

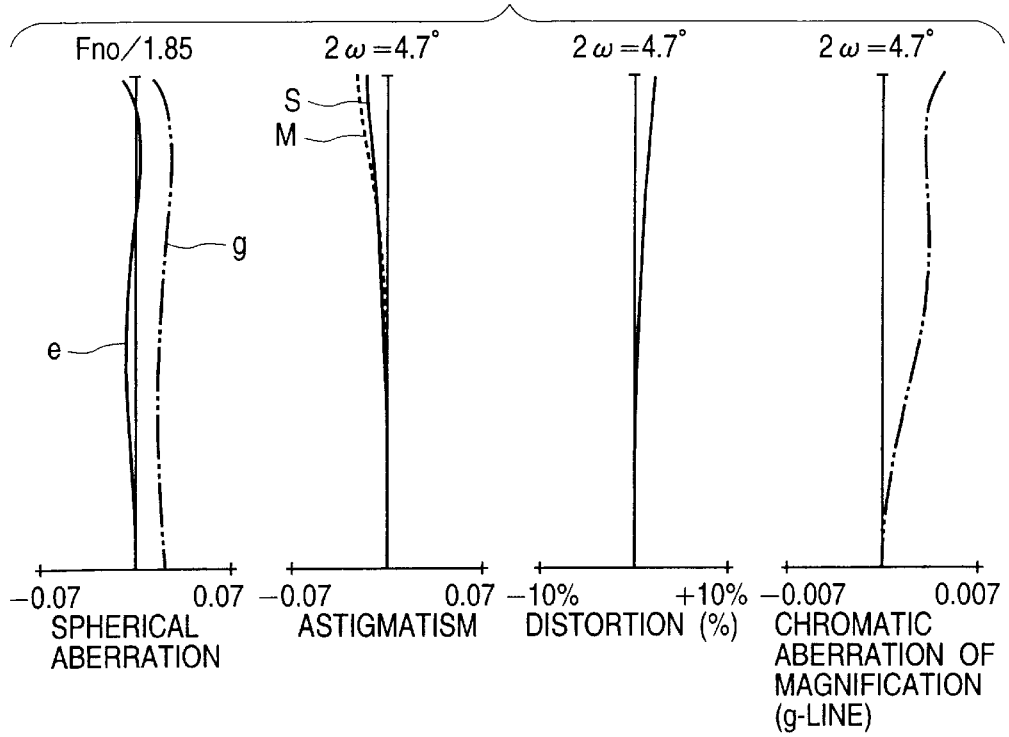
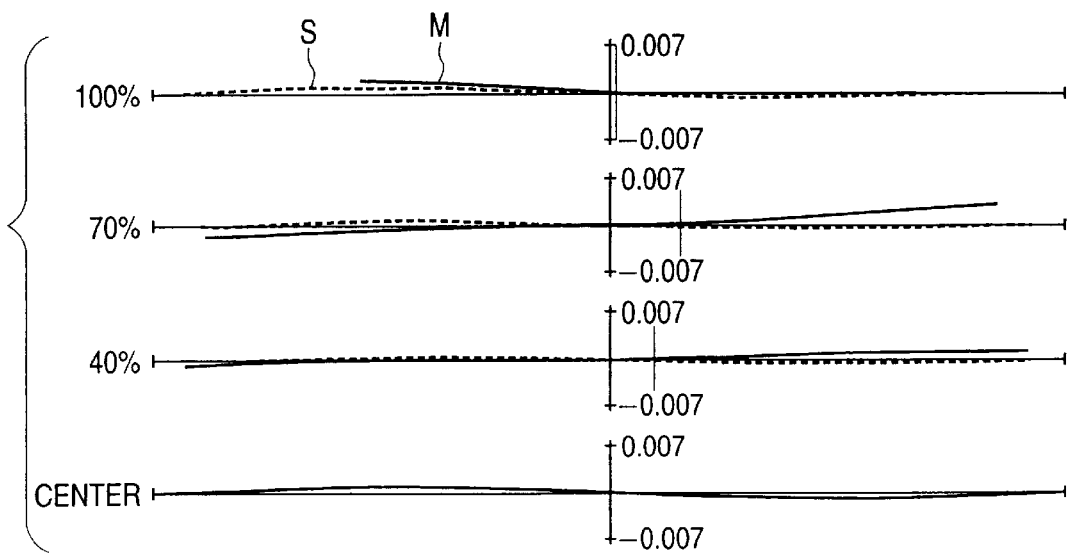

ZOOM LENS

BACKGROUND OF THE INVENTION

1. Field of the Invention

The present invention relates to a zoom lens which is suitably used for a TV camera, still camera, or the like and properly uses aspherical surfaces as some parts in a lens system to have a large aperture, high power, and good optical performance throughout the entire magnification range.

2. Related Background Art

Conventionally, zoom lenses having large apertures, high magnification ratios, and good optical performance have been required for a TV camera, still camera, video camera, and the like. In broadcasting color TV cameras, in particular, importance is attached to operability and mobility. In accordance with such requirements, ⅔- and ½-inch compact CCDs (solid-state image sensing devices) have become mainstream as photographing devices.

Since such a CCD has an almost uniform resolution throughout the entire image sensing range, a zoom lens using this device is required to have an almost uniform resolution in a range from the center of the frame to the periphery of the frame. Recently, with an increase in the density of CCDs, the resolutions of cameras have increased, and hence increasing demands have arisen for zoom lenses having higher performance.

For example, a zoom lens is required to have various aberrations, such as astigmatism, distortion, chromatic aberration of magnification, corrected, and have high optical performance throughout the frame, and a high magnification ratio. The zoom lens is also required to be compact and lightweight.

Of the zoom lenses, a so-called 4-unit zoom lens can relatively easily have a high magnification ratio and large aperture and is often used as a zoom lens for a broadcasting color TV camera. This zoom lens is made up of a first lens unit having a positive refracting power and used for focusing, a second lens unit having a negative refracting power and used for a magnifying operation, a third lens unit having a positive refracting power and used to correct variations in the image surface with a magnifying operation, and a fourth lens unit for imaging. These lens units are arranged in the order named from the object side.

In general, to attain reductions in the size and weight of the overall lens system, the lens system adopts an arrangement for increasing the refracting power of each lens unit. If, however, the negative power of the second lens unit for the magnifying operation and the positive power of the third lens unit are increased to attain reductions in the size and weight of the lens system by saving the space for the magnifying portion, a problem is posed in terms of variations in aberration upon zooming. Spherical aberration, astigmatism, and halo/coma, in particular, greatly vary, resulting in a great deterioration in optical performance. Variations in the aberrations due to zooming become more noticeable as the lens system has a higher zoom ratio and a speed of lens becomes faster. For this reason, various methods of correcting aberration variations due to a magnifying operation have been proposed.

For example, Japanese Patent Application Laid-Open No. 6-59191 discloses a 4-unit zoom lens, as a zoom lens having an f-number of about 1.6 to 1.8, a large aperture with a magnification ratio of about 18 to 40, and a high power, which is made up of a first lens unit having a fixed positive refracting power in a magnifying operation, a second lens unit having a negative refracting power which is variable in a magnifying operation, a third lens unit having a positive refracting power and used to correct variations in the imaging plane due to the magnifying operation, and a fourth lens unit having a positive refracting power and used for imaging. These lens units are arranged in the order named from the object side. In this zoom lens, an aspherical surface shaped to increase the positive refracting power is formed in the third lens unit.

Japanese Patent Application Laid-Open No. 8-82741 discloses a 4-unit zoom lens, as a zoom lens having an f-number of about 1.6, a large aperture with a magnification ratio of about 40, and a high power, which is made up of a first lens unit having a fixed positive refracting power in a magnifying operation, a second lens unit having a negative refracting power which is variable in the magnifying operation, a third lens unit having a positive refracting power and used to correct variations in the imaging plane due to a magnifying operation, and a fourth lens unit having a positive refracting power and used for imaging. These lens units are arranged in the order named from the object side. In this zoom lens, a flare-cut stop is disposed between the second and third lens units.

In a zoom lens, to obtain high optical performance throughout the entire magnification range with an f-number of about 1.5 to 1.8, a large aperture, and a magnification ratio of about 18 to 50, the refracting powers of the respective lens units, the arrangement of lenses, aberration sharing, and achromatic sharing, and the like must be properly set.

In many cases, in order to obtain, for example, high optical performance with little aberration variations throughout the entire magnification range and the entire focus range, the degree of freedom in aberration correction must be increased by increasing the number of lens elements constituting each lens unit. For this reason, when a zoom lens with a high aperture ratio and a high magnification ratio is to be realized, the number of lenses inevitably increases, resulting in an increase in the overall size of the lens system.

As the magnification ratio increases, variations in aberrations during zooming, and more specifically, variations in spherical aberration and halo/coma, increase. This make it very difficult to obtain high optical performance while reducing the overall size of the lens system throughout the magnification range from the wide-angle end to the telephoto end.

As a means for solving this problem, a zoom lens having aspherical surfaces or using a flare-cut stop has been proposed.

The arrangement disclosed in Japanese Patent Application Laid-Open No. 6-59191 is effective in reducing variations spherical aberration accompanying a magnifying operation, and more specifically, variations in spherical aberration on the telephoto side. With this arrangement, however, aberration variations near the intermediate focal length cannot be satisfactorily reduced. The technique disclosed in Japanese Patent Application Laid-Open No. 8-82741 is designed to remove aberration variations near the intermediate focal length, and more specifically, halo/coma, by using the flare-cut stop. This technique has drawbacks, e.g., requiring a complicated mechanism.

To improve the performance of a zoom lens while attaining reductions in the size and weight of the overall zoom lens, the refracting power of each lens unit and lens configuration must be properly set. In order to increase the power of a zoom lens, it is important to achieve the optimal balance between the refracting powers of a variator lens for the magnifying operation and the compensator lens for correcting variations in the image surface upon magnifying operation and the overall zoom lens system.

SUMMARY OF THE INVENTION

It is an object of the present invention to provide a compact zoom lens having a large aperture and high magnification ratio. More specifically, it is an object of the present invention to provide a zoom lens which obtains good optical performance by providing a predetermined aspherical surface at a predetermined position in a third lens unit.

According to the present invention, there is provided a zoom lens comprising a first lens unit having a positive refracting power and being fixed during zooming, a second lens unit having a negative refracting power and being movable during zooming, a third lens unit having a positive refracting power and used to correct the image surface by the zooming, and a fourth lens unit having a positive refracting power, the lens units being sequentially arranged from an object side, wherein when imaging magnifications of the second and third lens units simultaneously pass through a −1-time point during zooming, and an intermediate focal length fm is given by $$fm = fw \cdot z^{1/2}$$

where fw is a wide-angle focal length, and z is a zoom ratio, and an aspherical surface shaped to decrease a positive refracting power or increase a negative refracting power is provided at a lens surface of the third lens unit which satisfies $$1 < |h3'/h3|$$

where h3 is a height at which an on-axial marginal ray passes, and h3' is a height at which an off-axial marginal ray that is formed into an image at a maximum image height passes, at this intermediate focal length fm.

BRIEF DESCRIPTION OF THE DRAWINGS

FIGS. 19A, 19B and 19C are graphs each showing various aberrations in the sixth embodiment;

FIGS. 20A, 20B and 20C are graphs each showing various aberrations in the sixth embodiment;

DETAILED DESCRIPTION OF THE PREFERRED EMBODIMENTS

Figure 1:
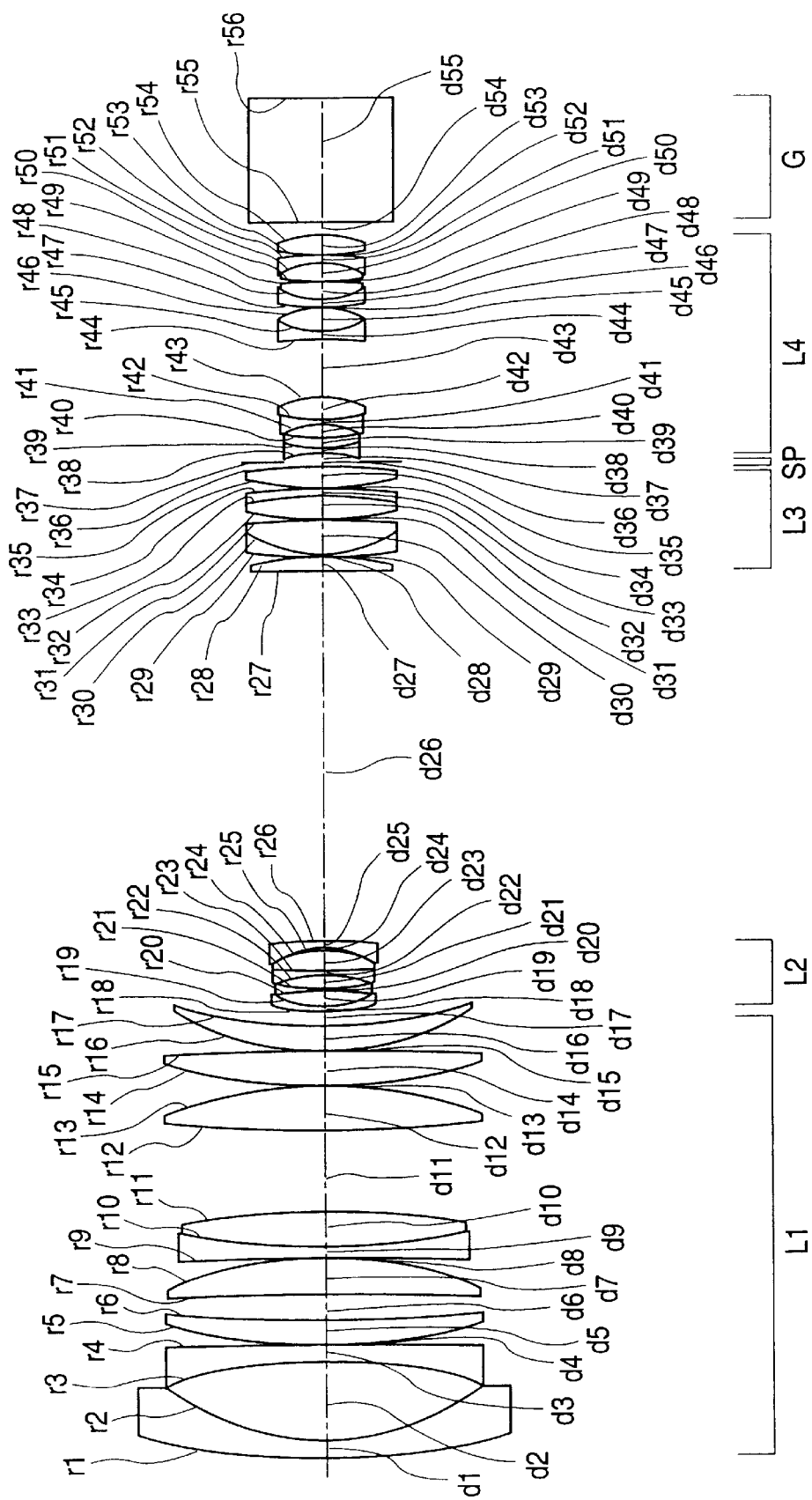
FIG. 1 is a sectional view of a lens system at the wide-angle end according to the first embodiment.
Figure 2:
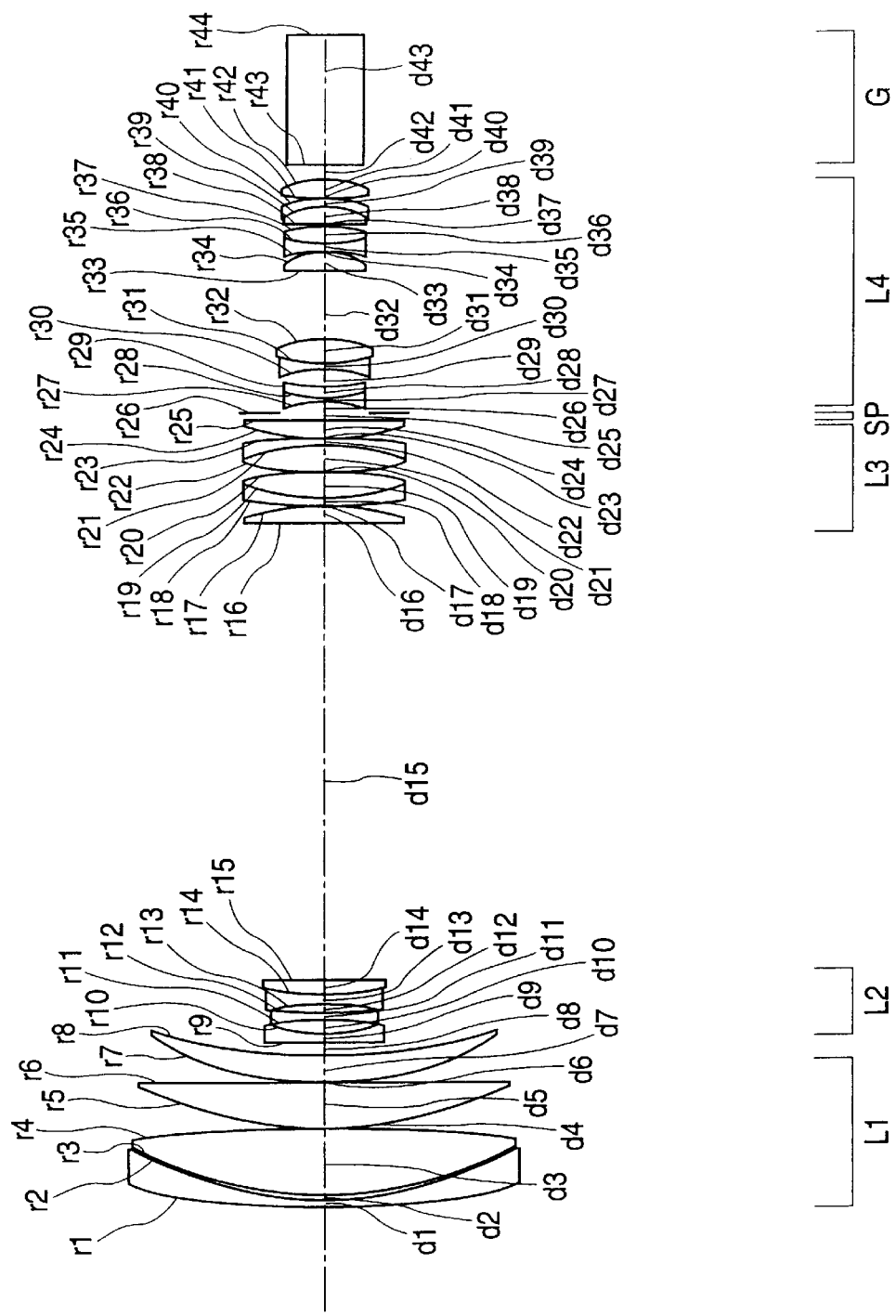
FIG. 2 is a sectional view of a lens system at the wide-angle end according to the second embodiment.
Figure 3:
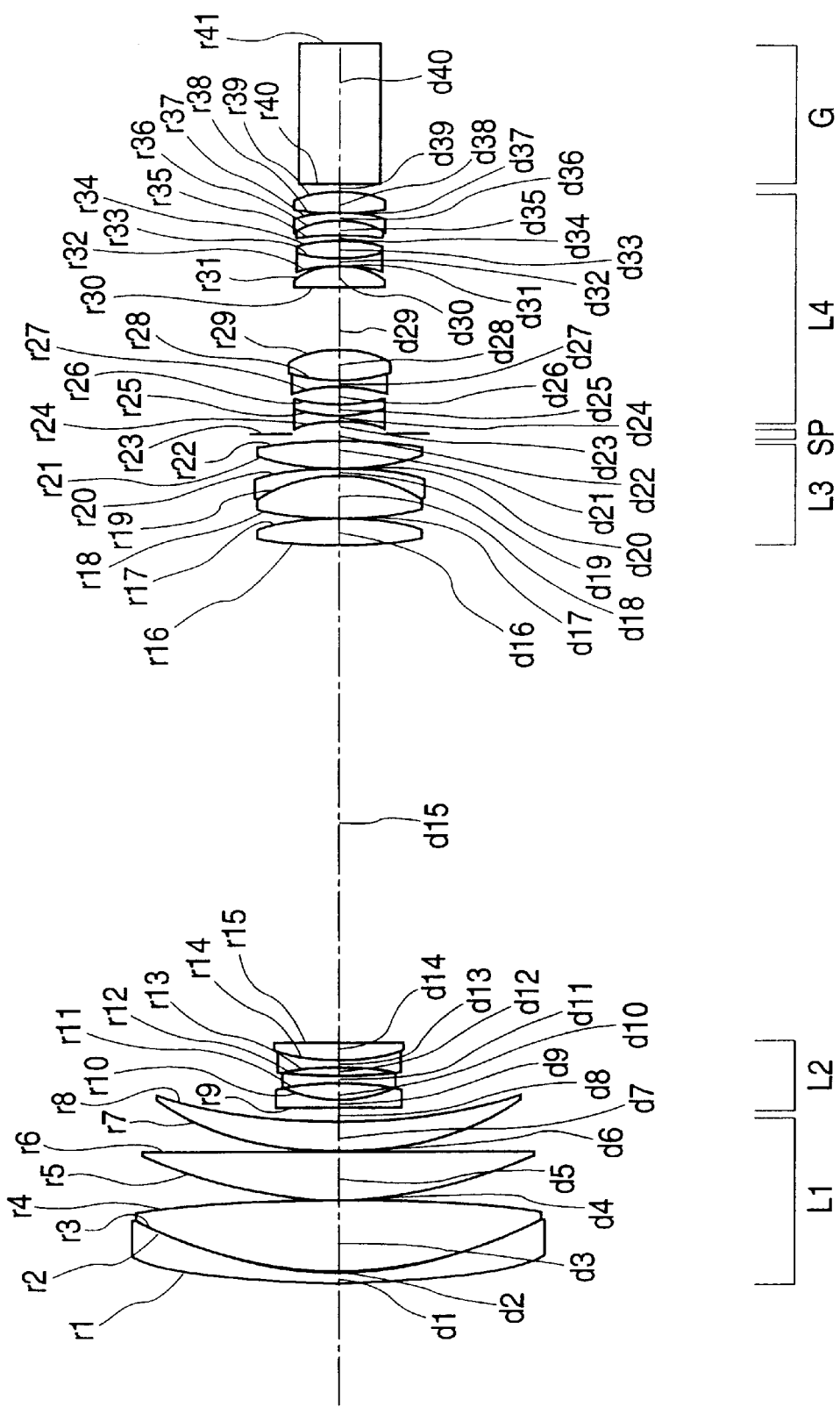
FIG. 3 is a sectional view of a lens system at the wide-angle end according to the third embodiment.
Figure 4:
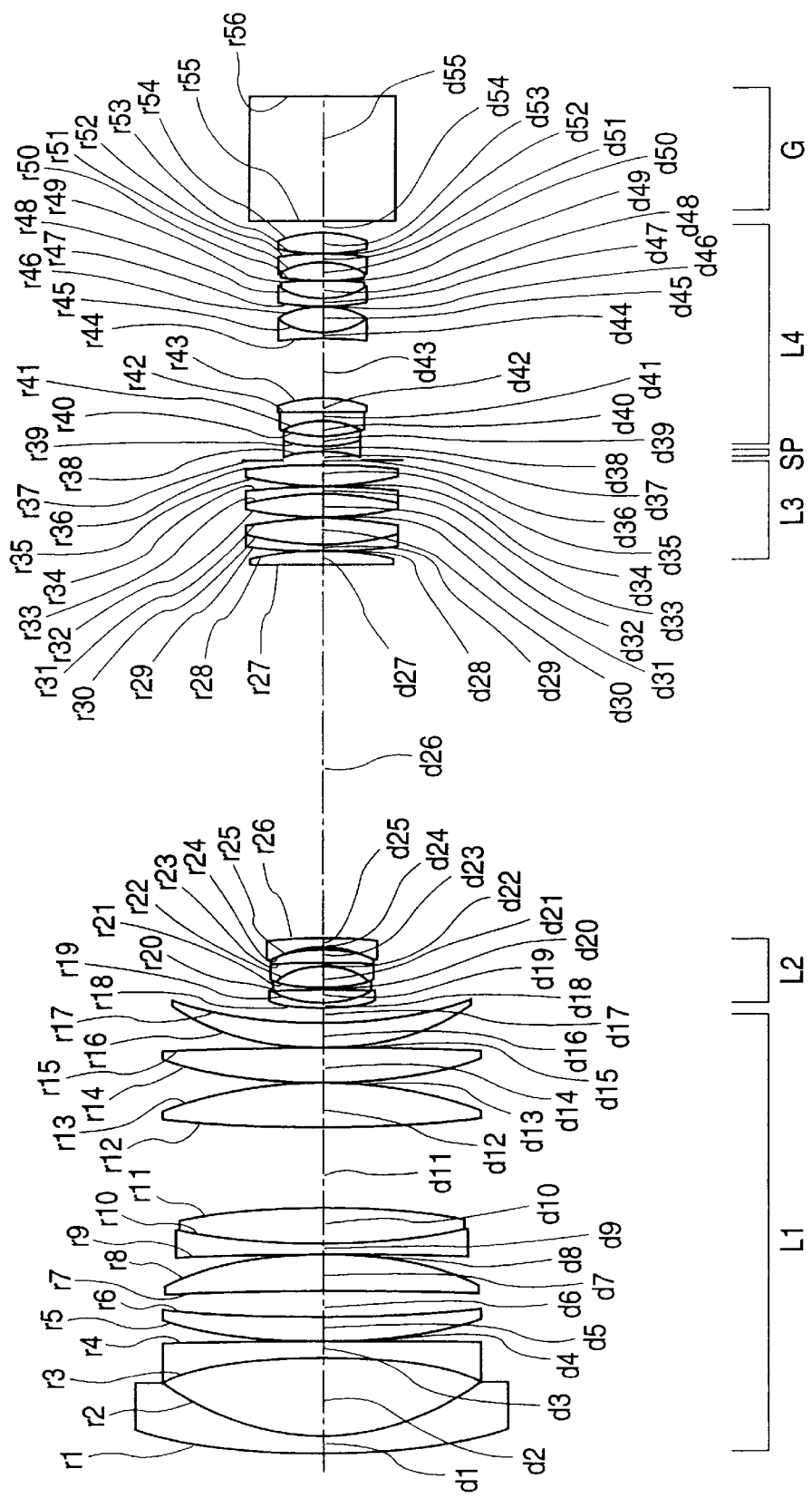
FIG. 4 is a sectional view of a lens system at the wide-angle end according to the fourth embodiment.
Figure 5:
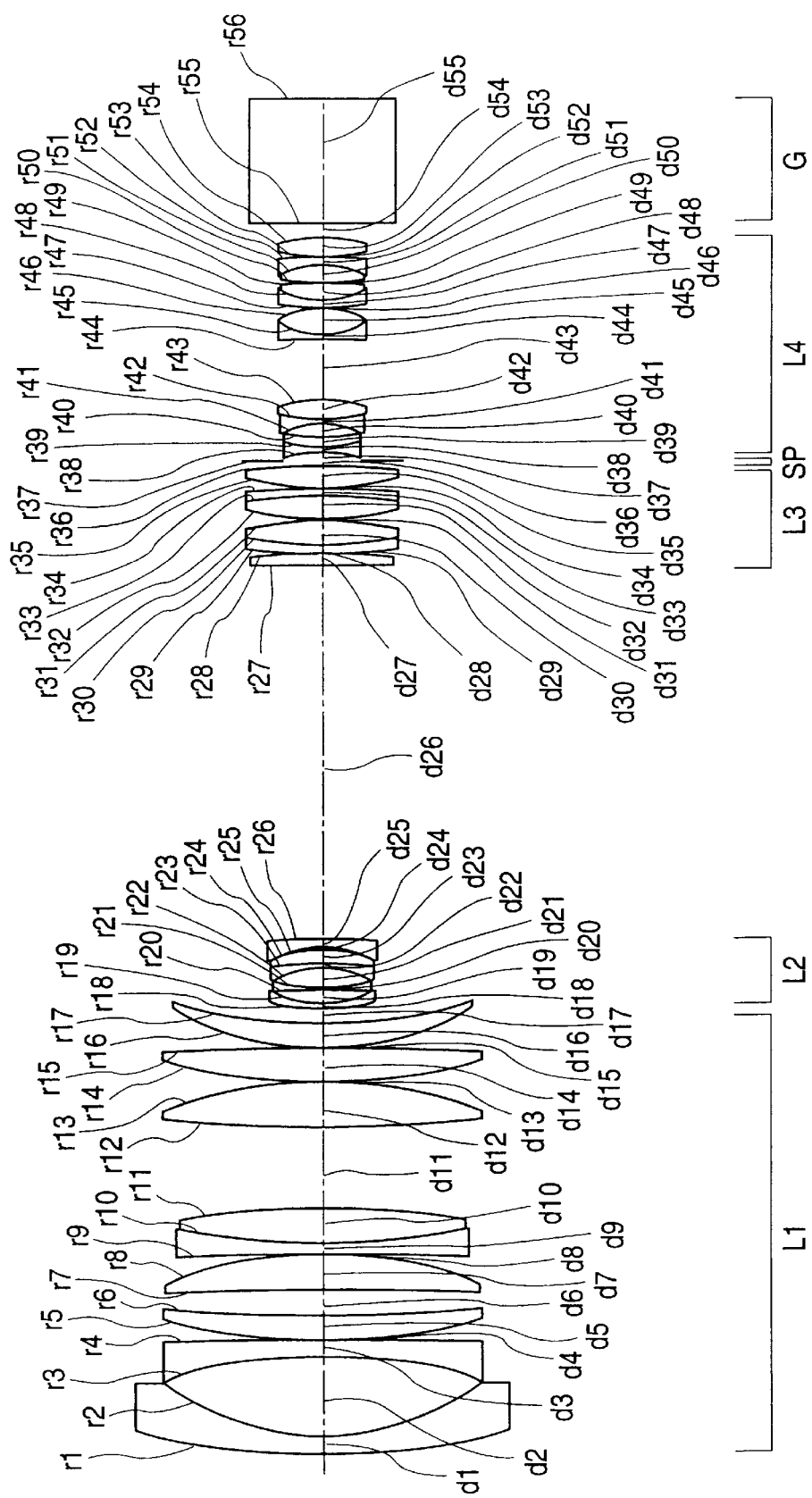
FIG. 5 is a sectional view of a lens system at the wide-angle end according to the fifth embodiment.
Figure 6:
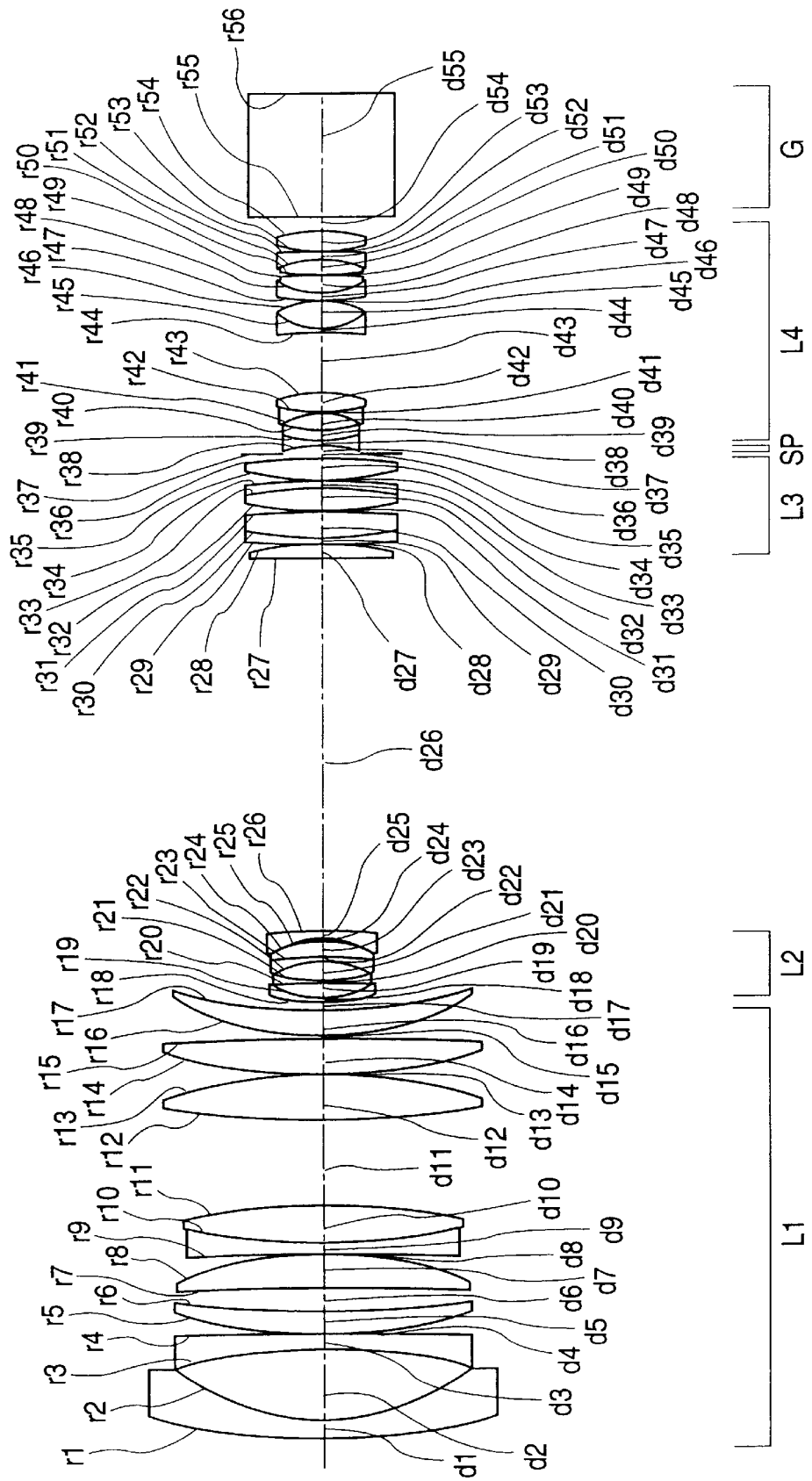
FIG. 6 is a sectional view of a lens system at the wide-angle end according to the sixth embodiment.
Figure 7:
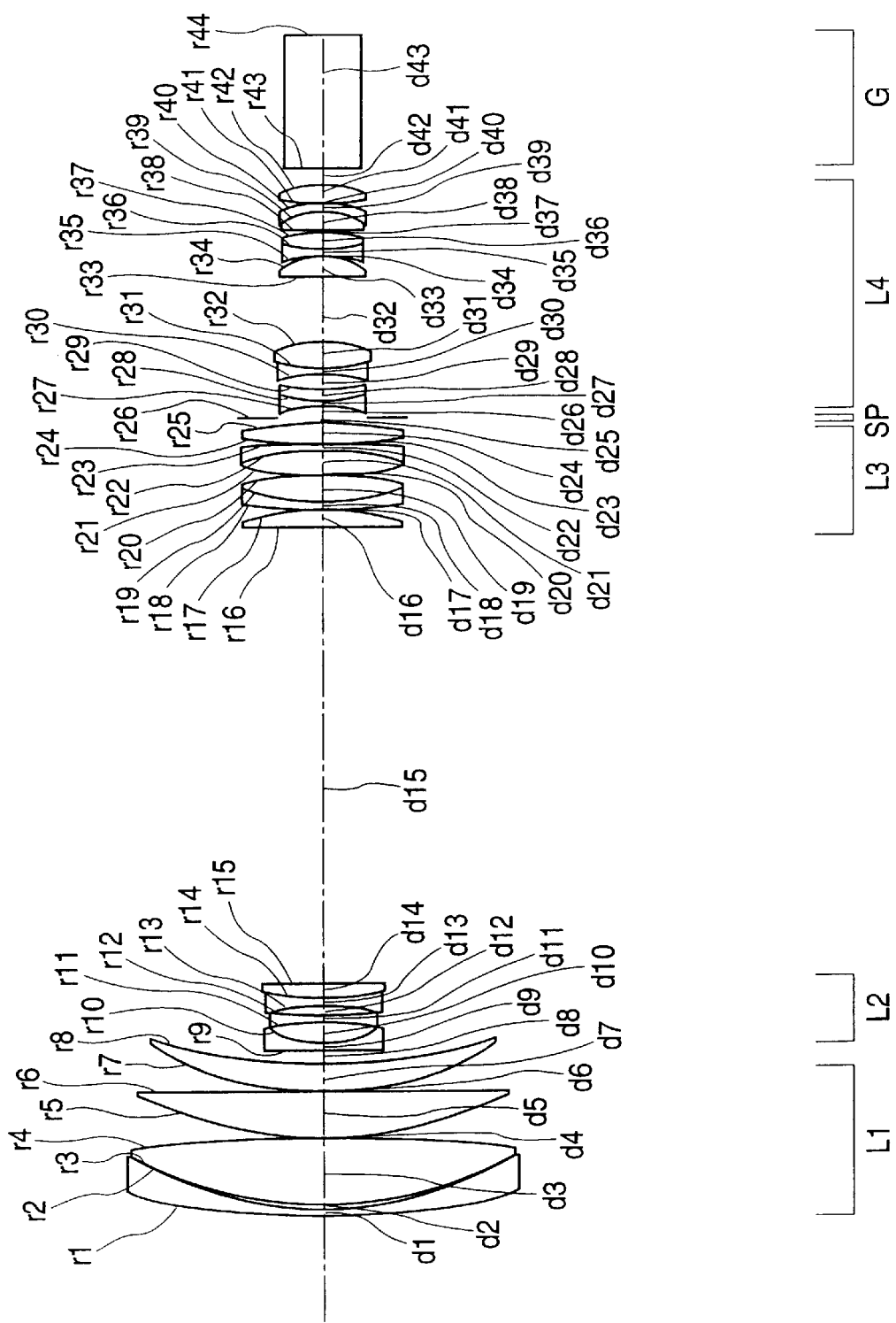
FIG. 7 is a sectional view of a lens system at the wide-angle end according to the seventh embodiment.
Figure 8:
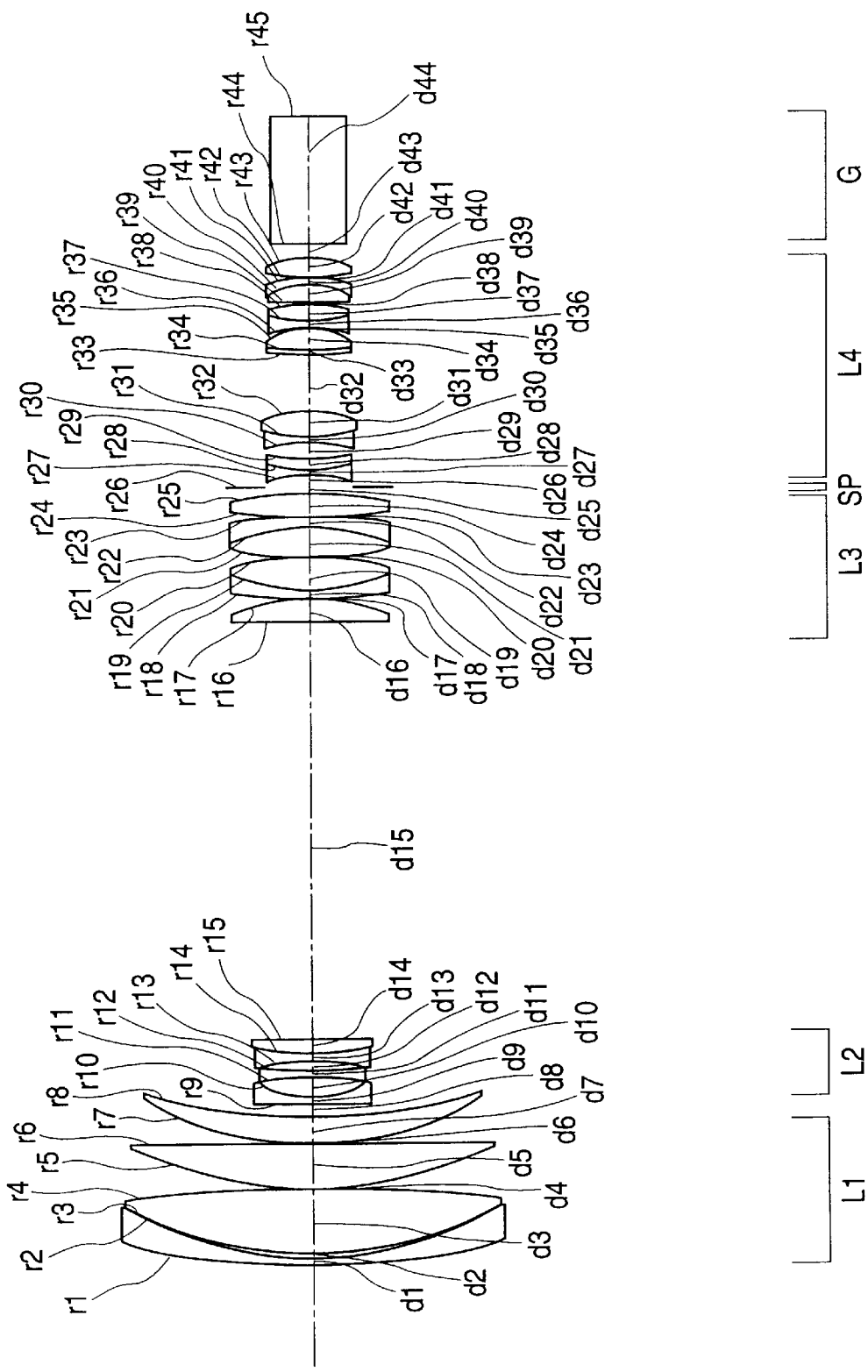
FIG. 8 is a sectional view of a lens system at the wide-angle end according to the ninth embodiment.
Figure 9A:
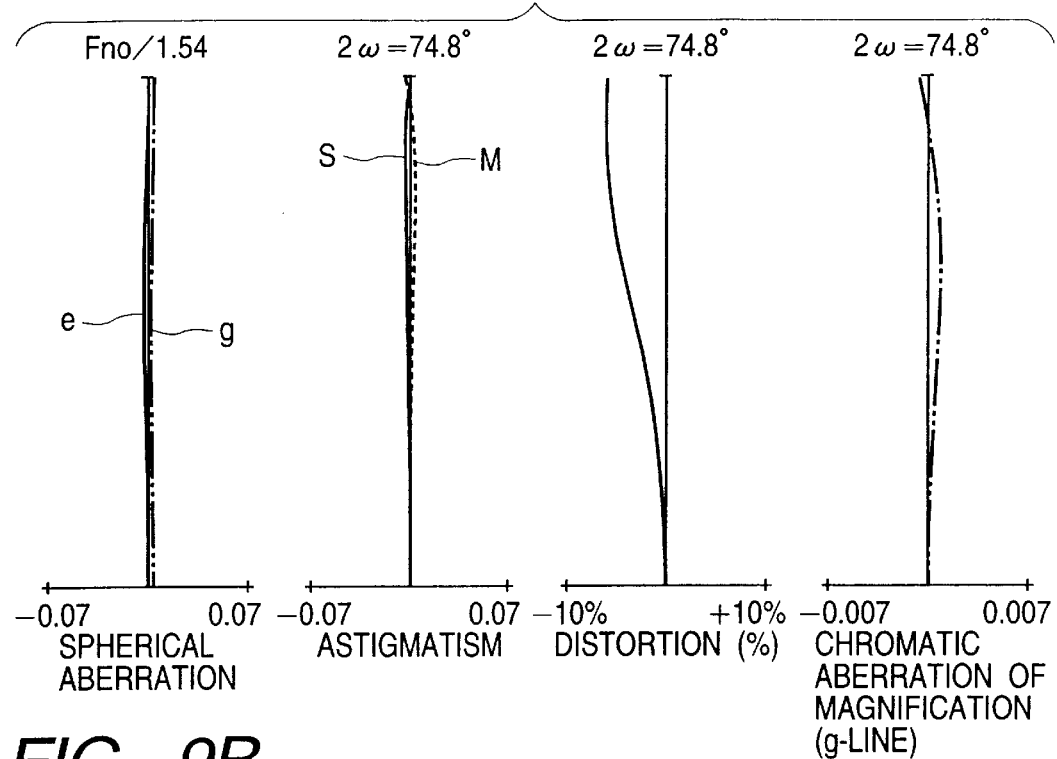
FIGS. 9A, 9B and 9C are graphs each showing various aberrations in the first embodiment.
Figure 9B:
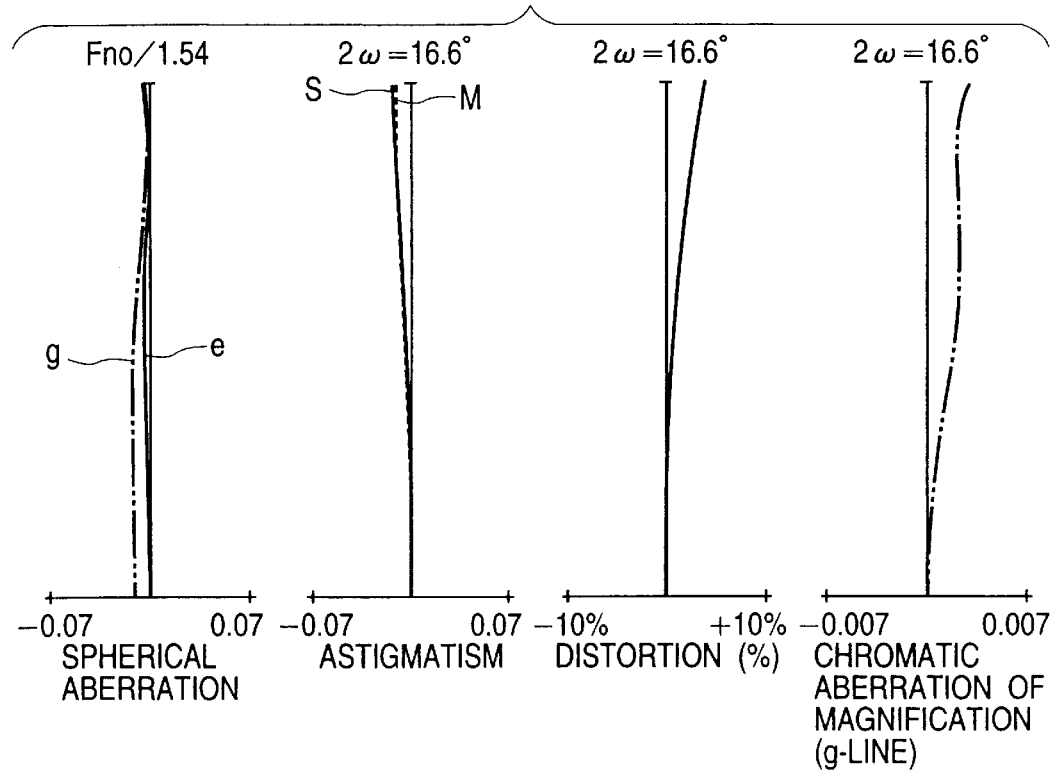
Figure 9C:
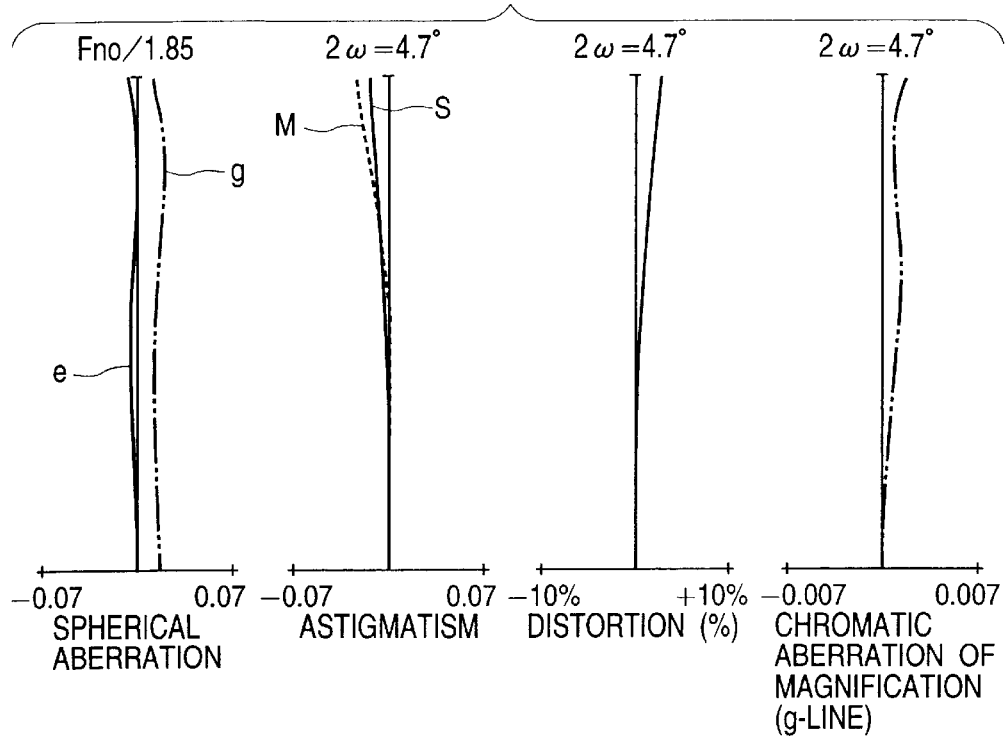
Figure 10A:
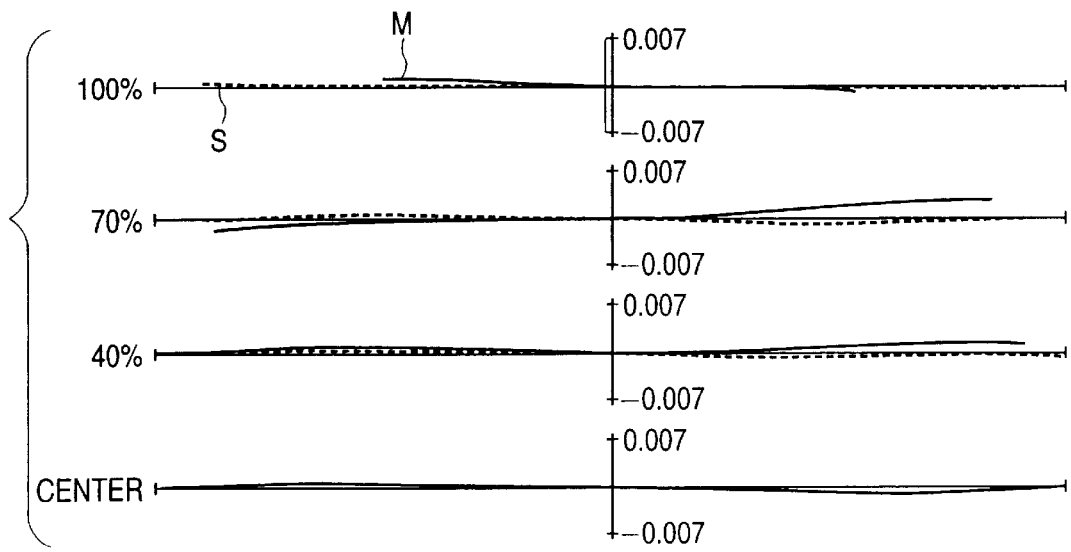
FIGS. 10A, 10B and 10C are graphs each showing various aberrations in the first embodiment.
Figure 10B:
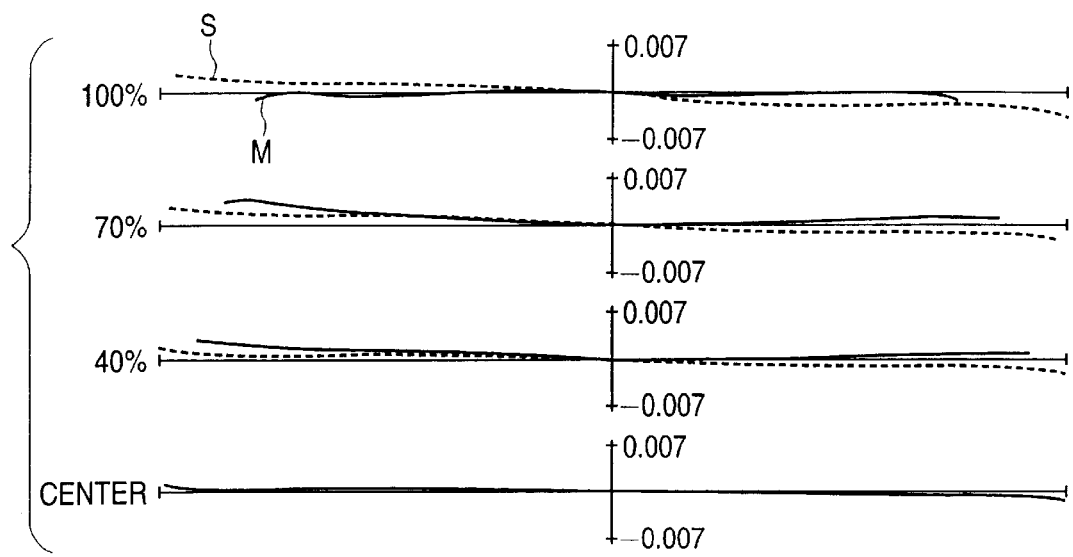
Figure 10C:
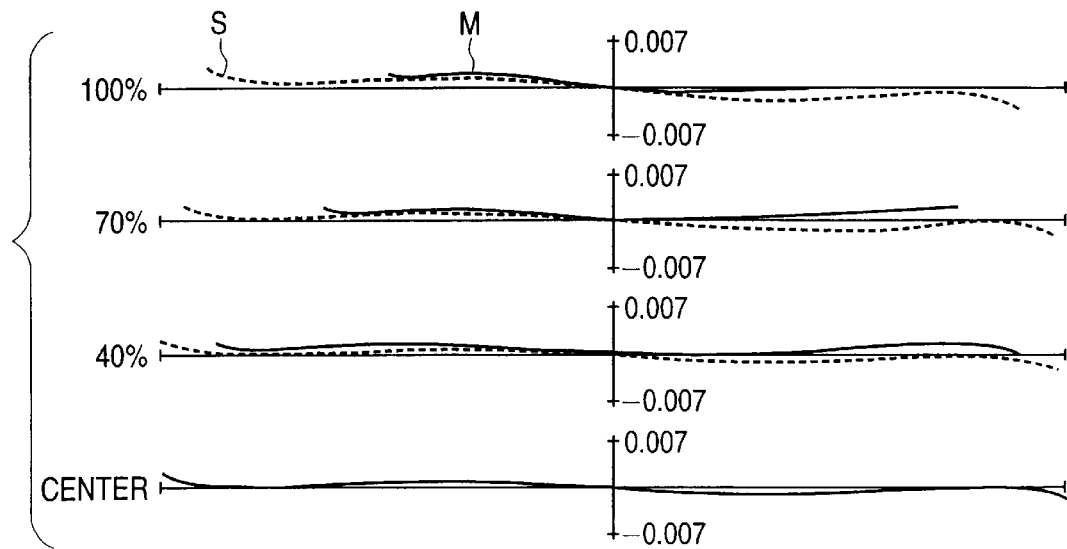
Figure 11A:
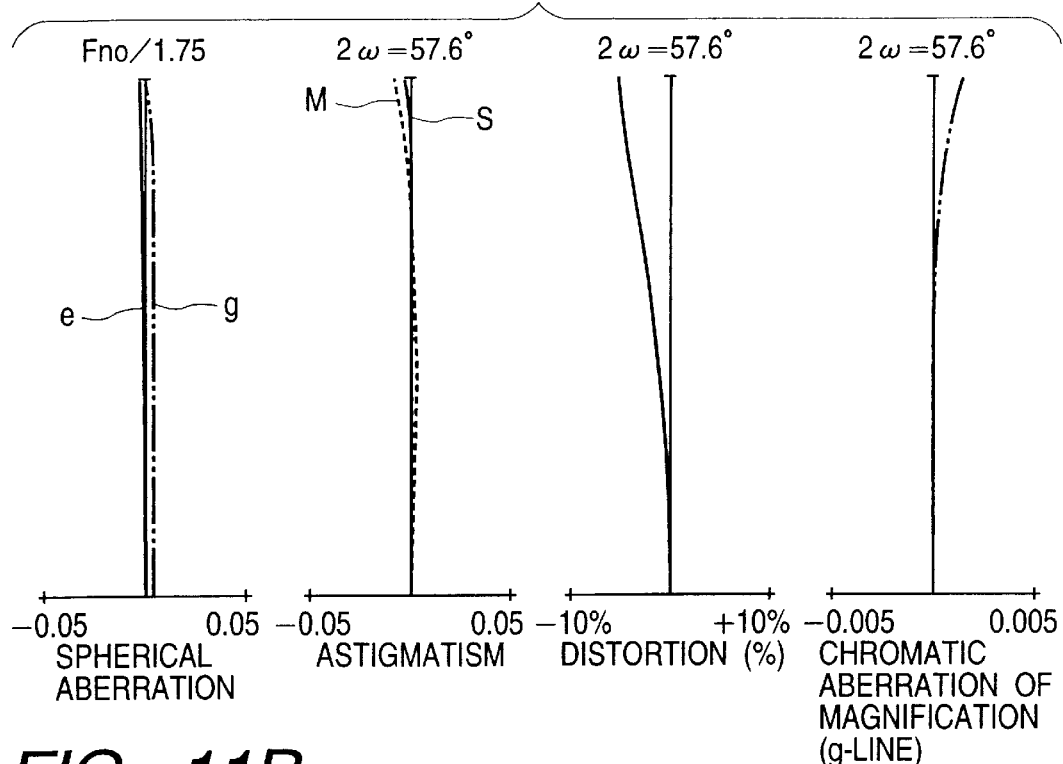
FIGS. 11A, 11B and 11C are graphs each showing various aberrations in the second embodiment.
Figure 11B:
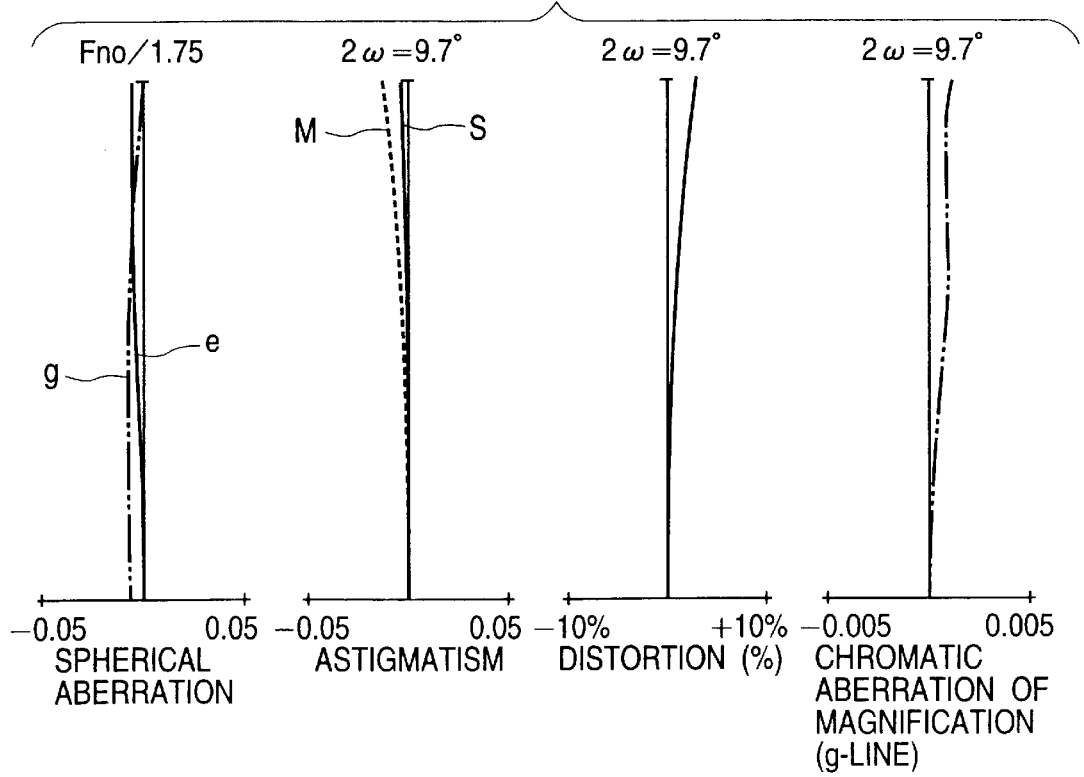
Figure 11C:
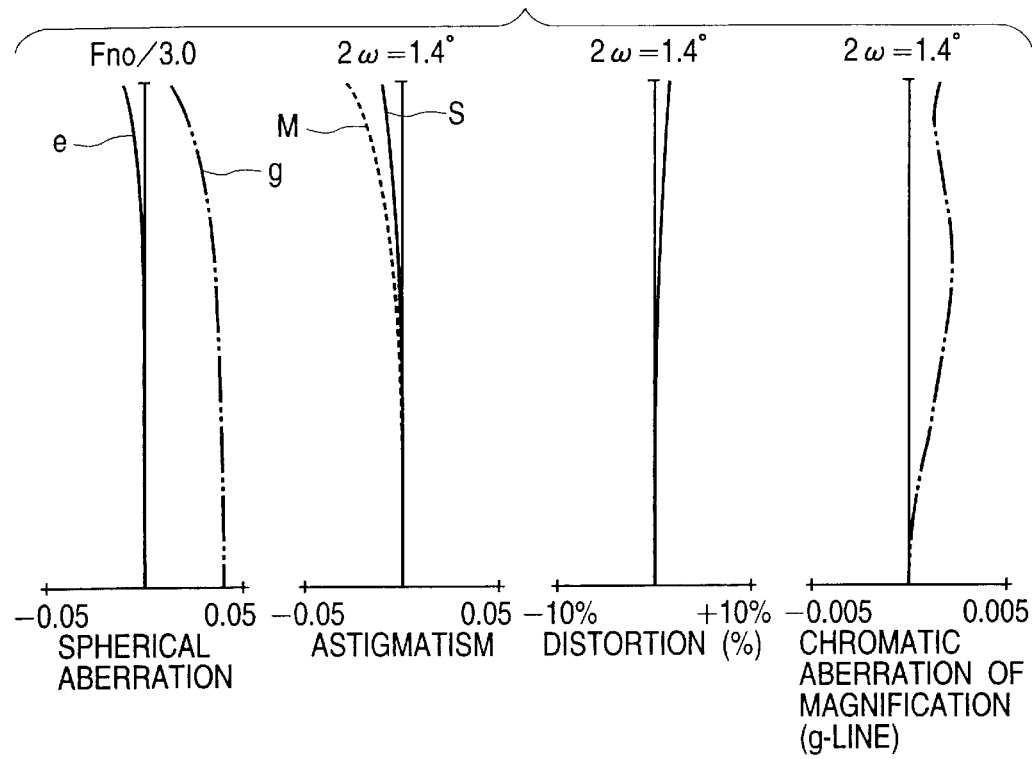
Figure 12A:
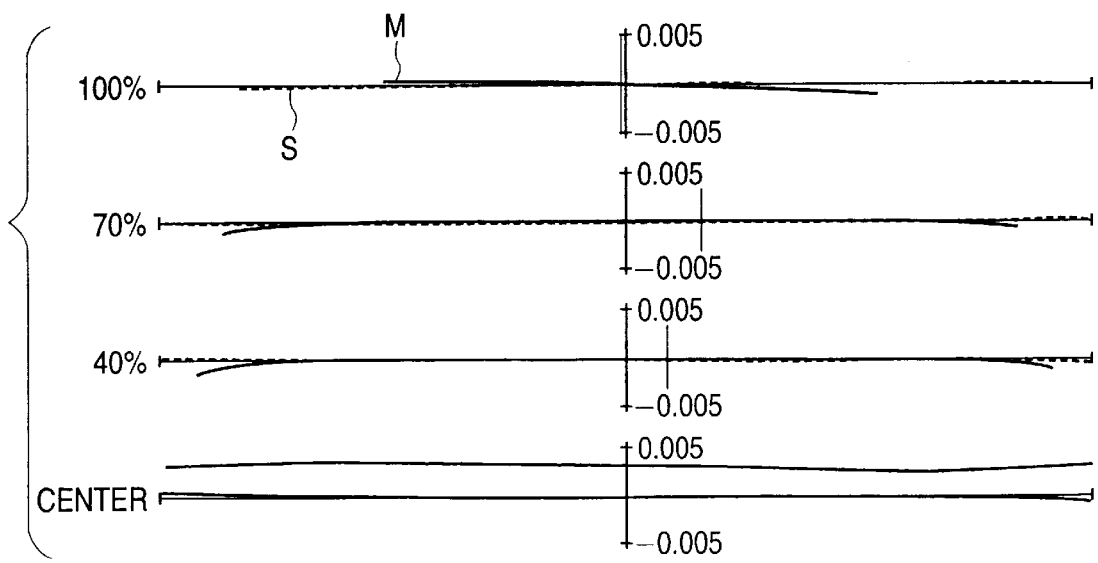
FIGS. 12A, 12B and 12C are graphs each showing various aberrations in the second embodiment.
Figure 12B:
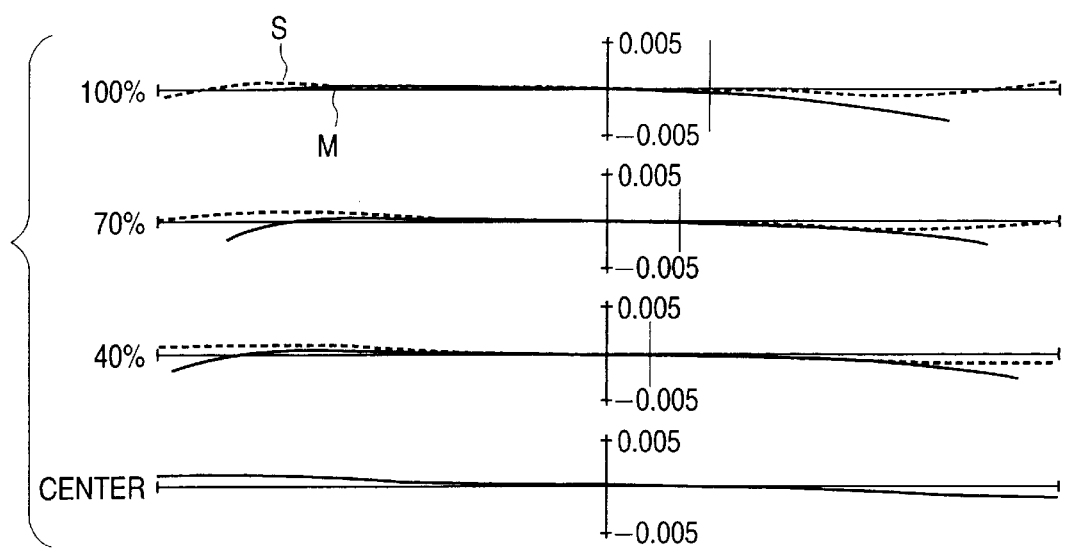
Figure 12C:
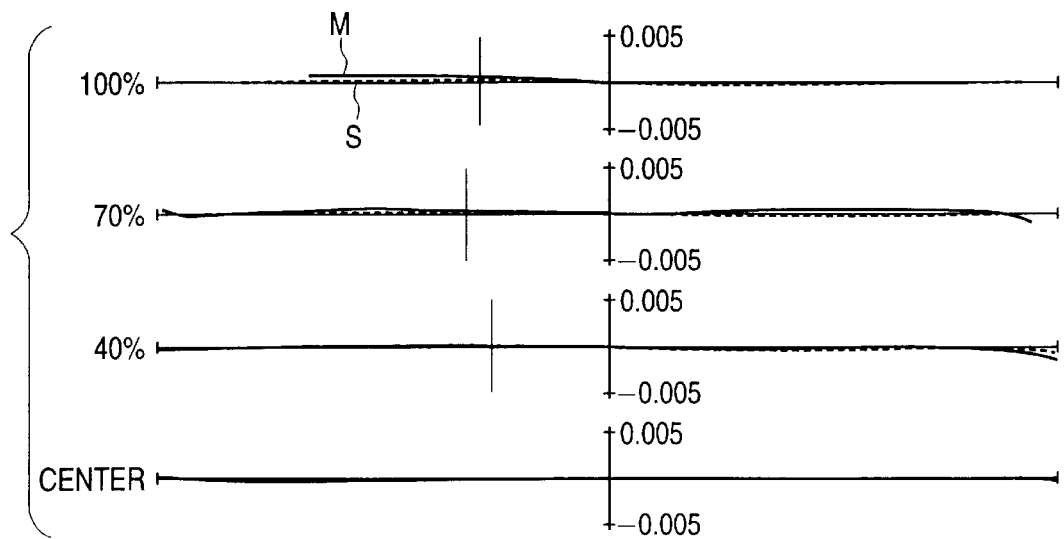
Figure 13A:
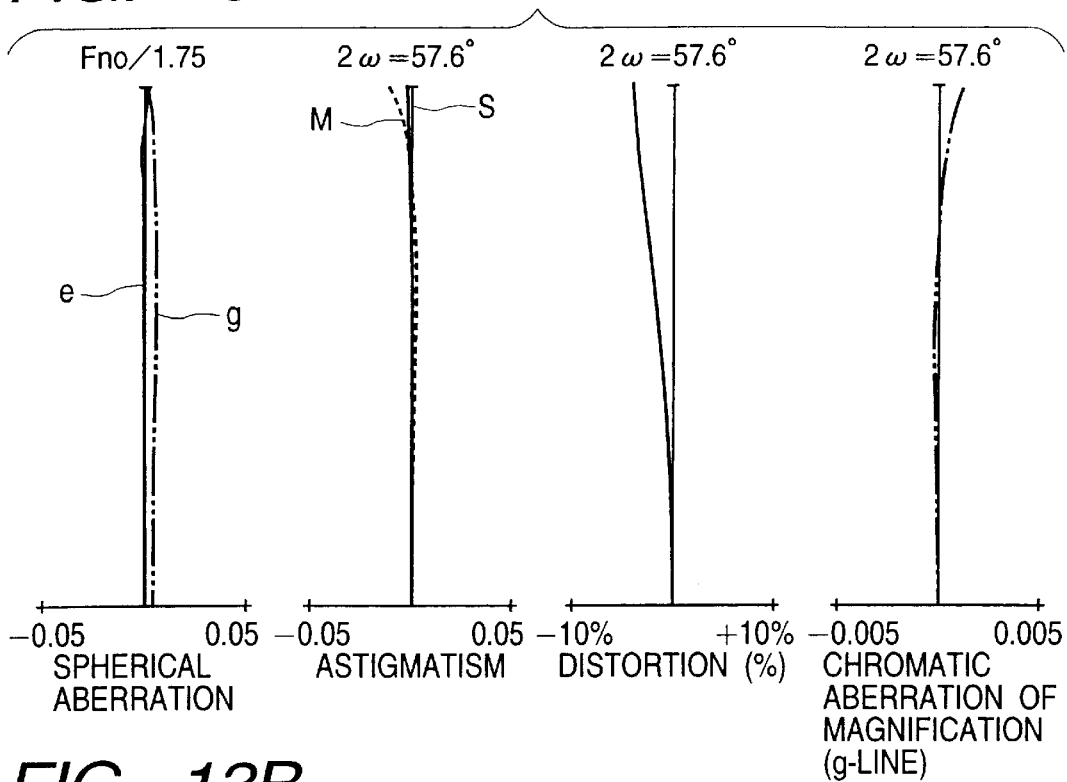
FIGS. 13A, 13B and 13C are graphs each showing various aberrations in the third embodiment.
Figure 13B:
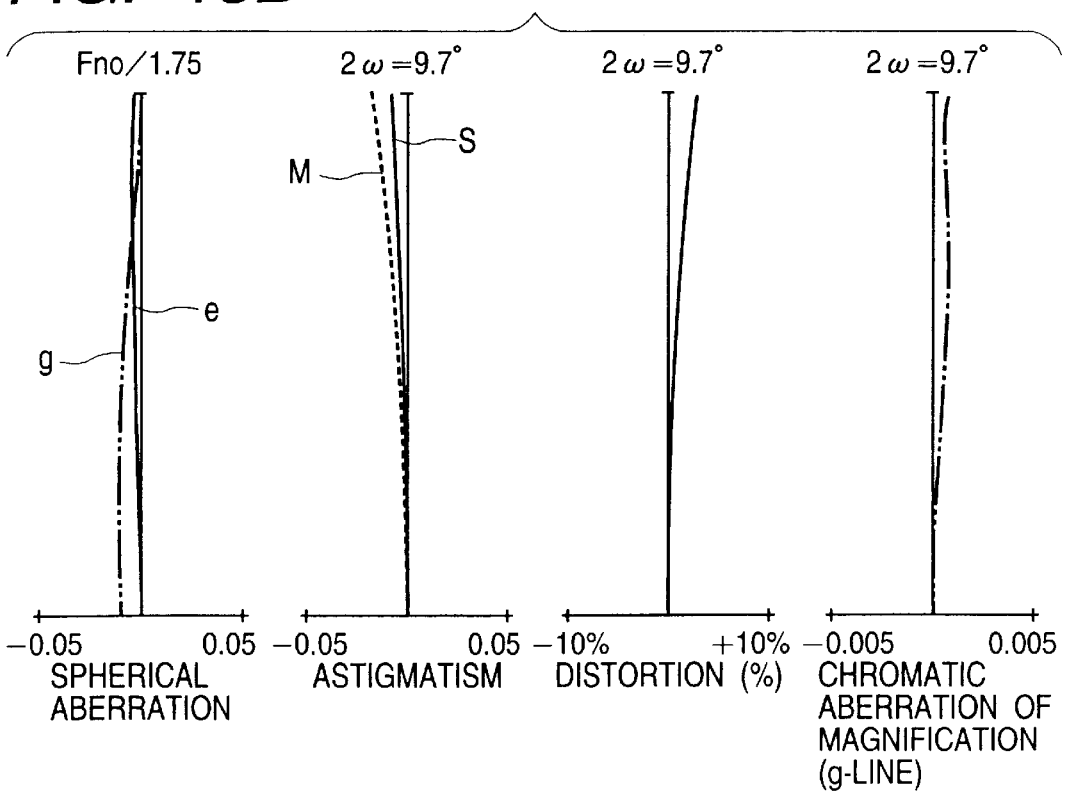
Figure 13C:
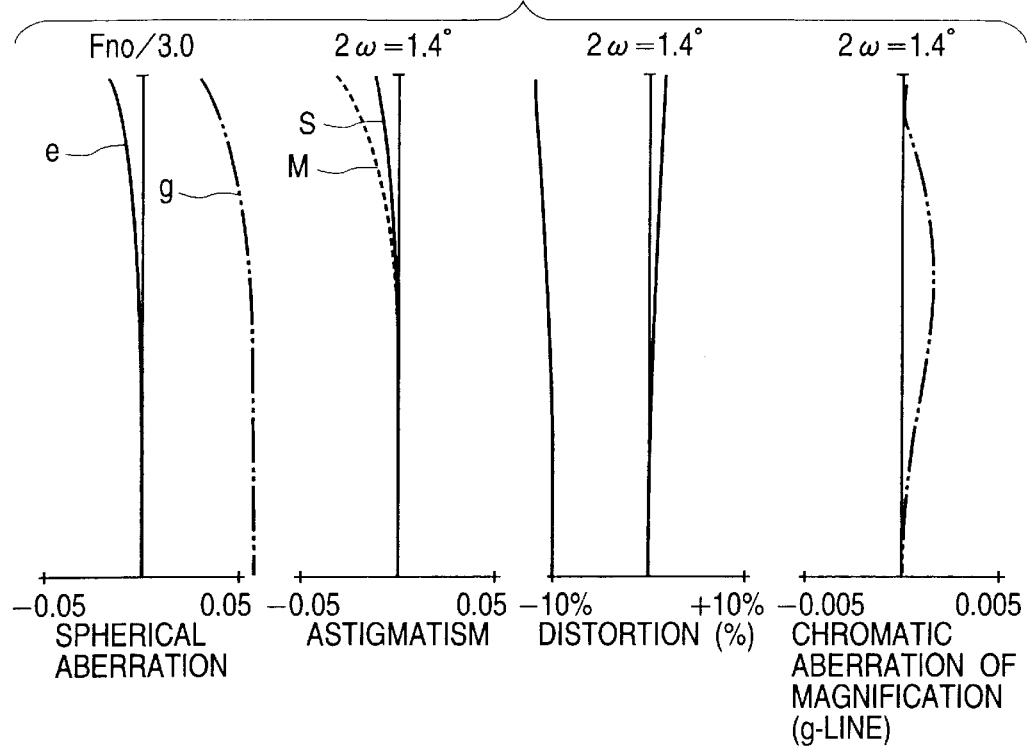
Figure 14A:
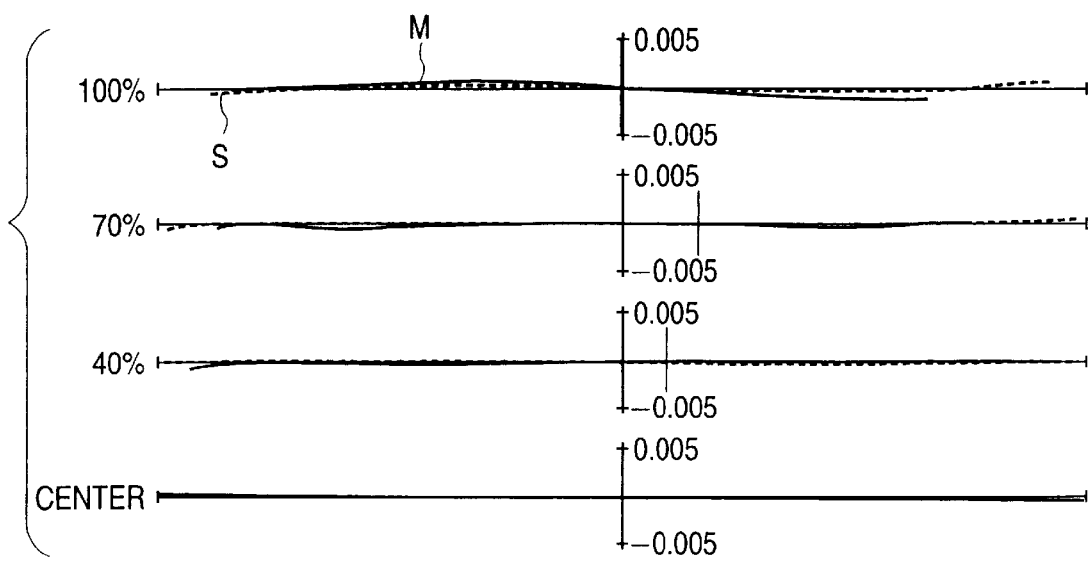
FIGS. 14A, 14B and 14C are graphs each showing various aberrations in the third embodiment.
Figure 14B:
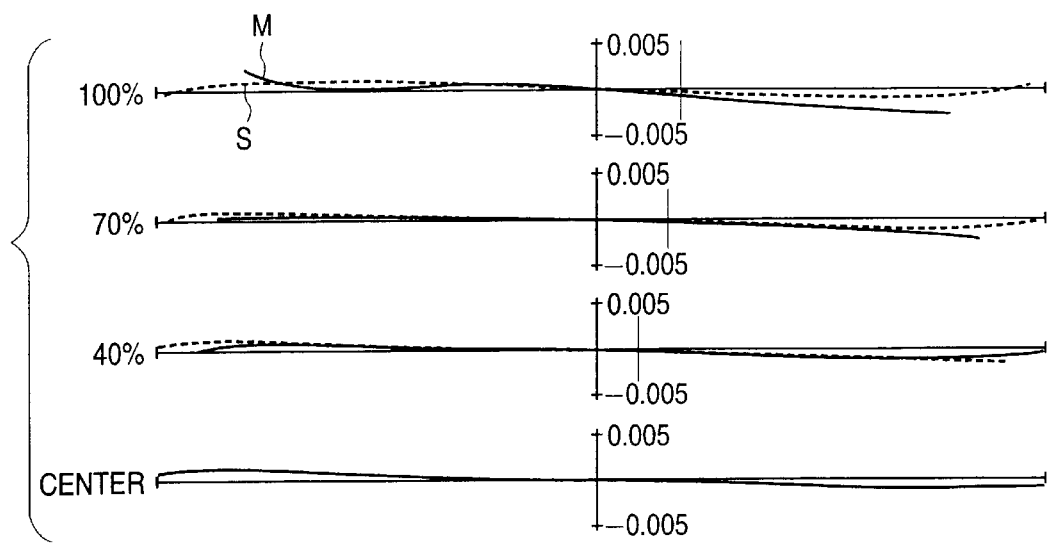
Figure 14C:
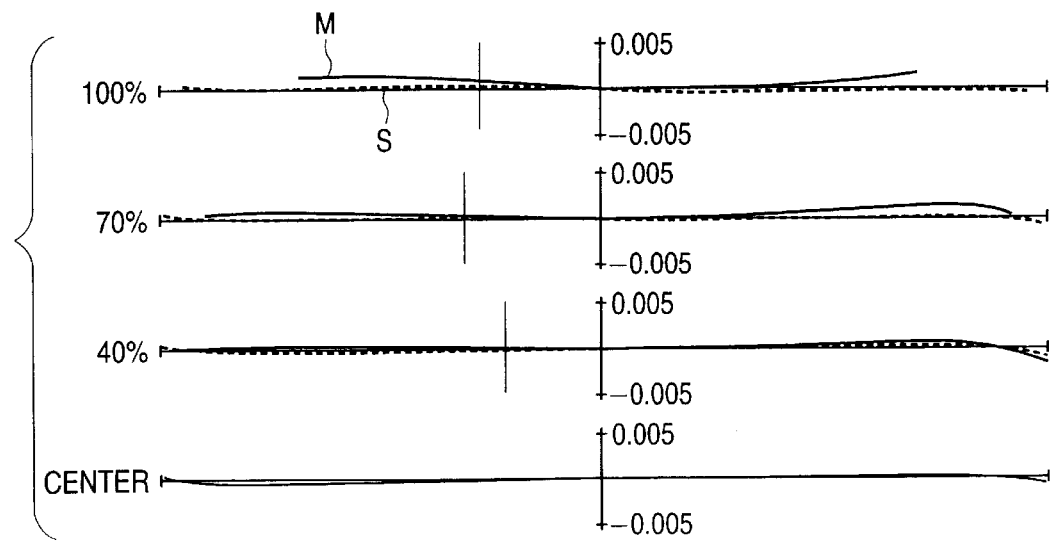
Figure 15A:
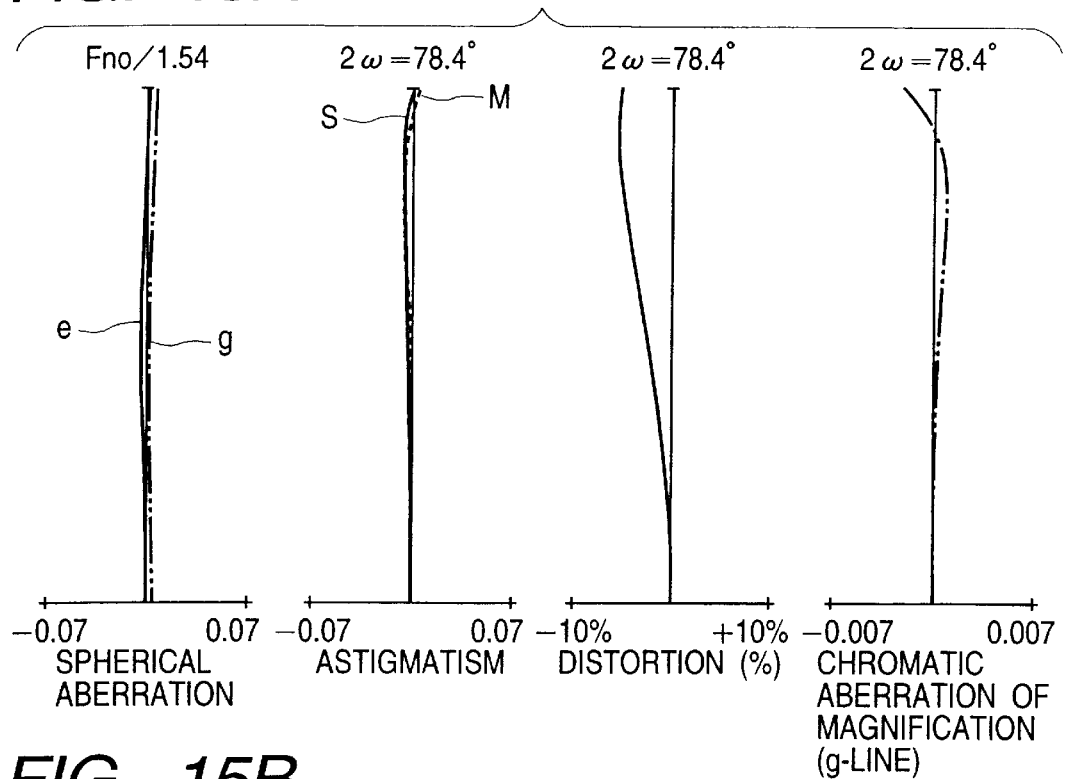
FIGS. 15A, 15B and 15C are graphs each showing various aberrations in the fourth embodiment.
Figure 15B:
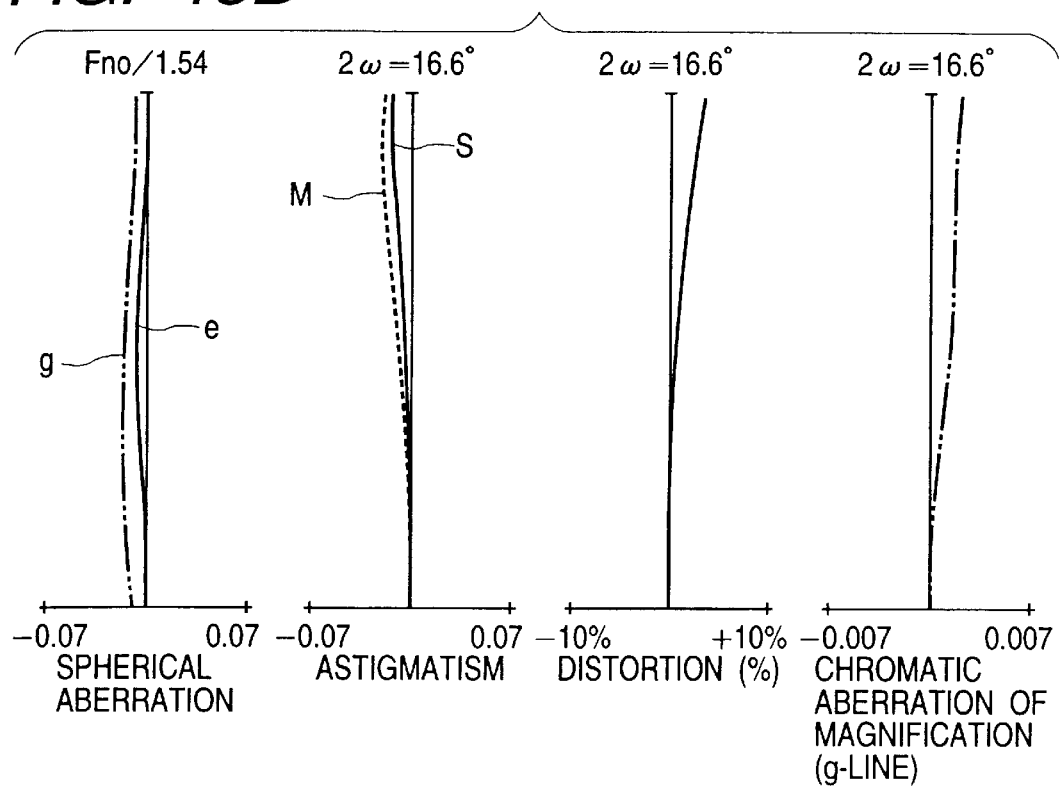
Figure 15C:
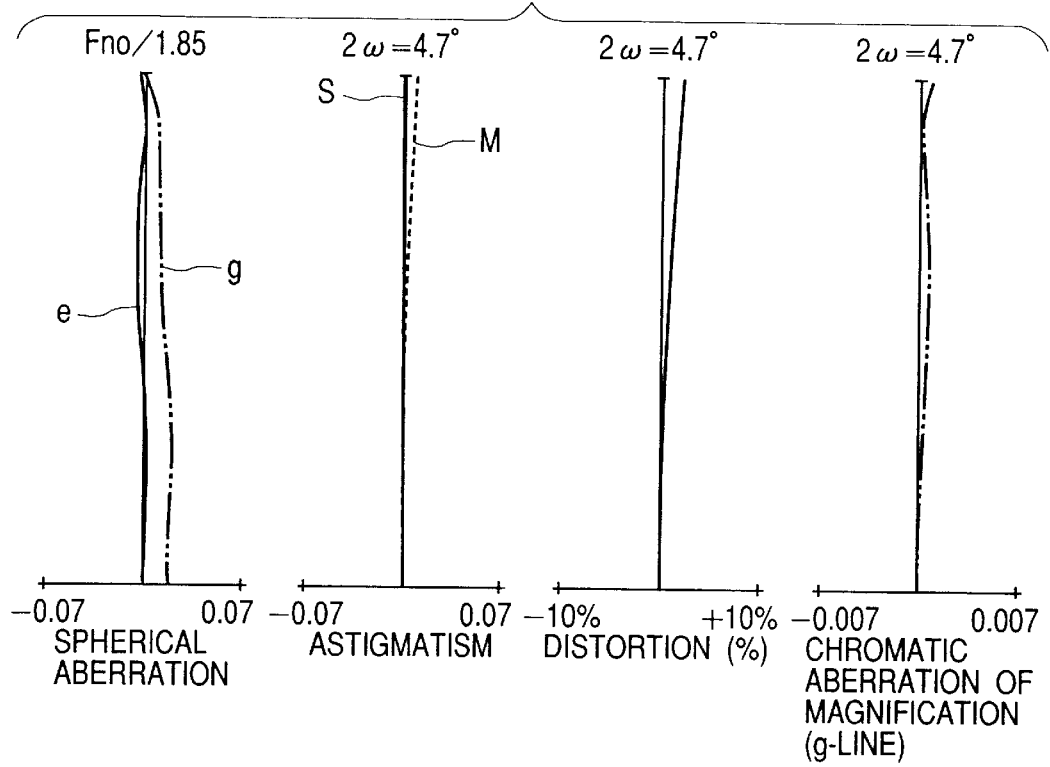
Figure 16A:
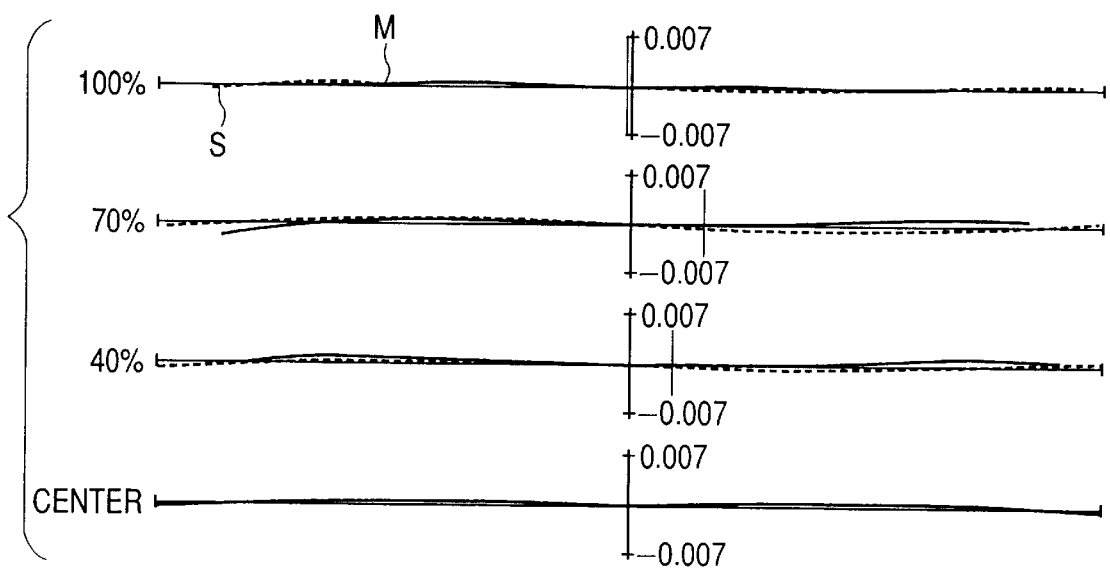
FIGS. 16A, 16B and 16C are graphs each showing various aberrations in the fourth embodiment.
Figure 16B:
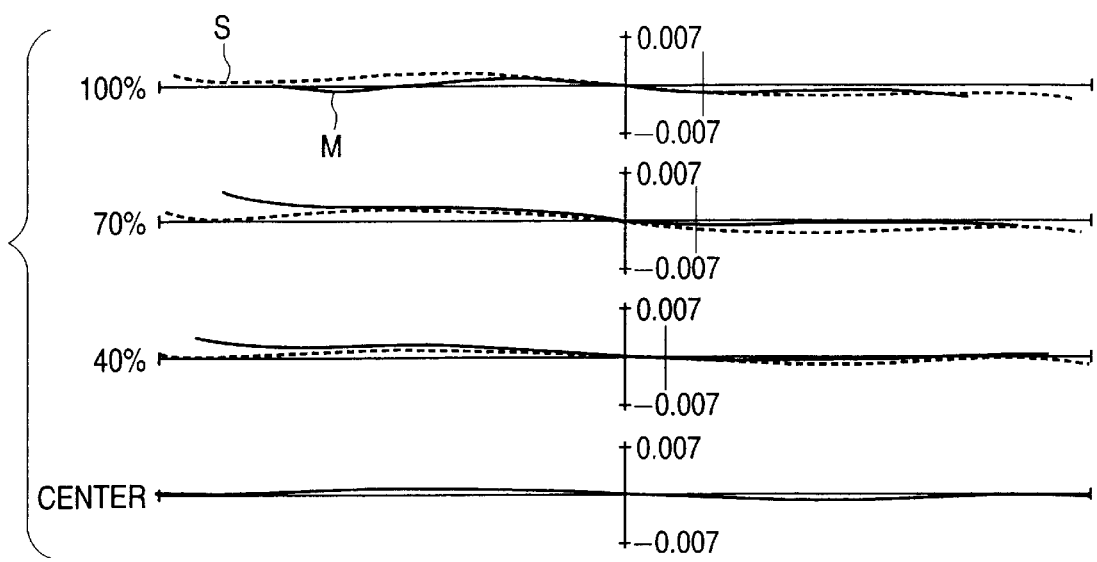
Figure 16C:
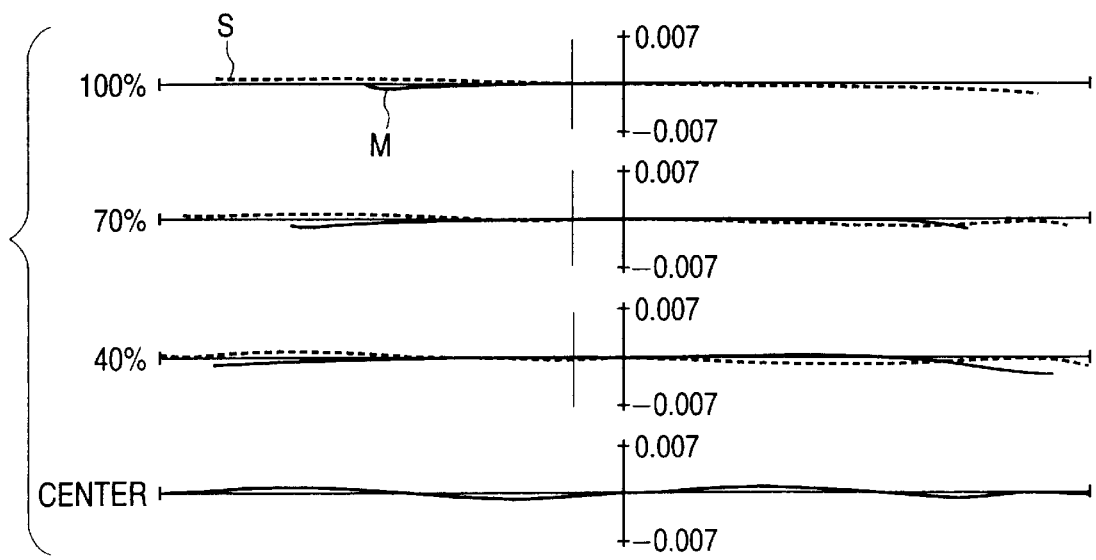
Figure 17A:
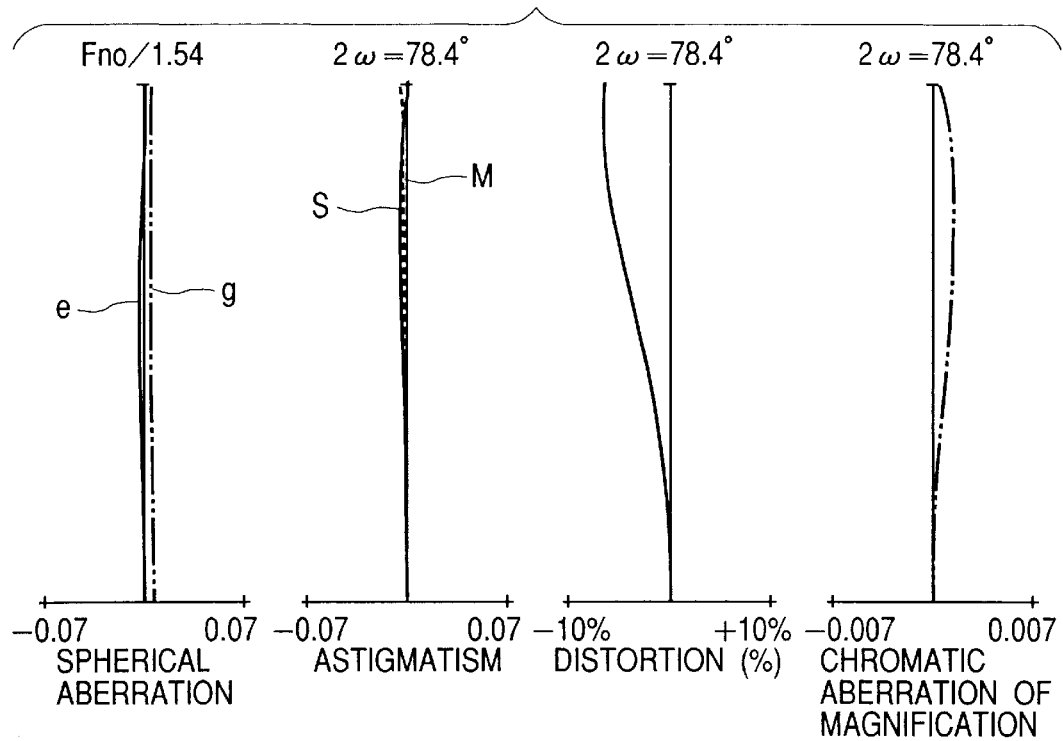
FIGS. 17A, 17B and 17C are graphs each showing various aberrations in the fifth embodiment.
Figure 17B:
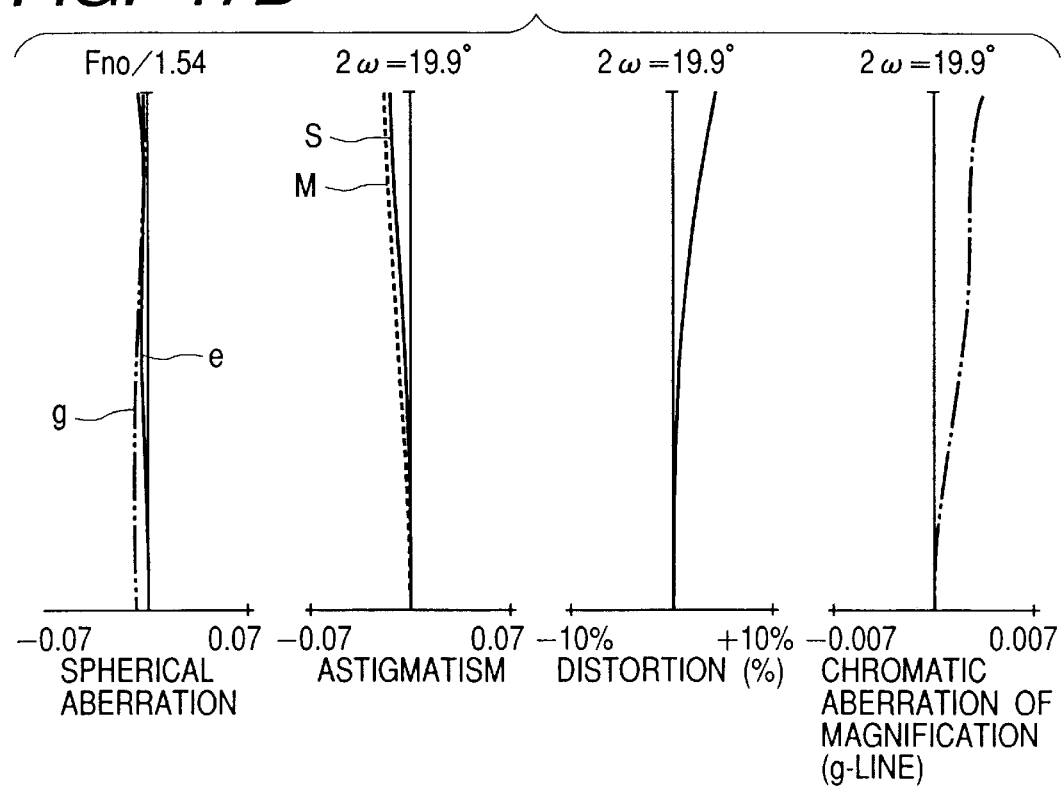
Figure 17C:
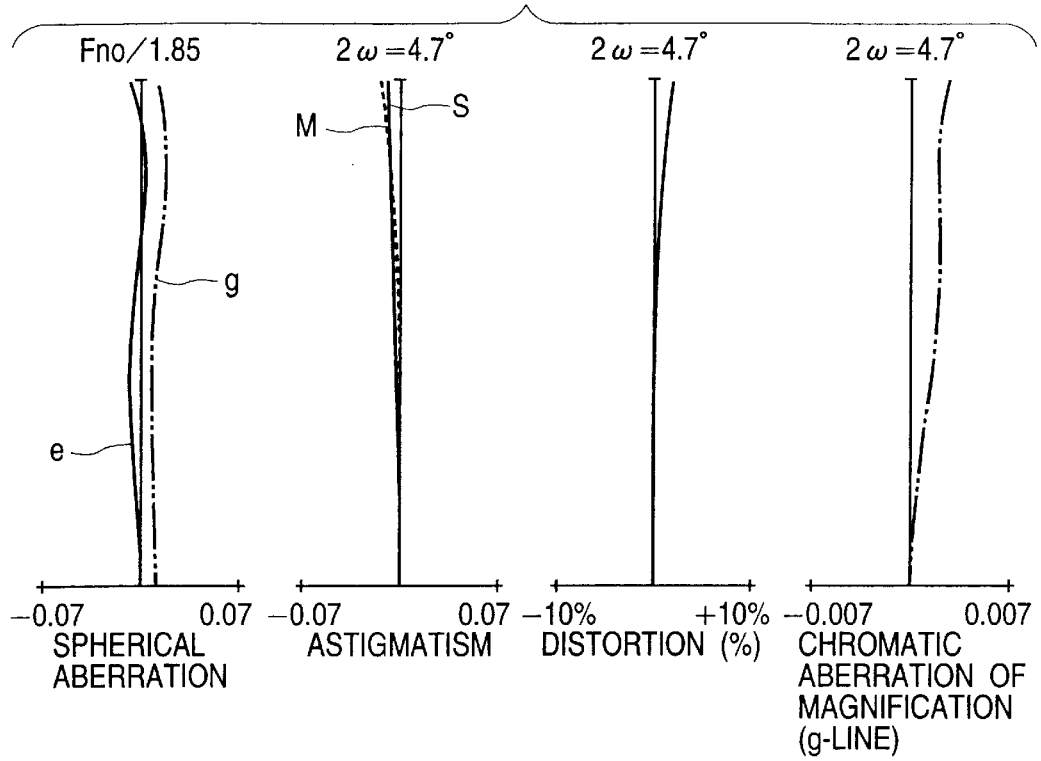
Figure 18A:
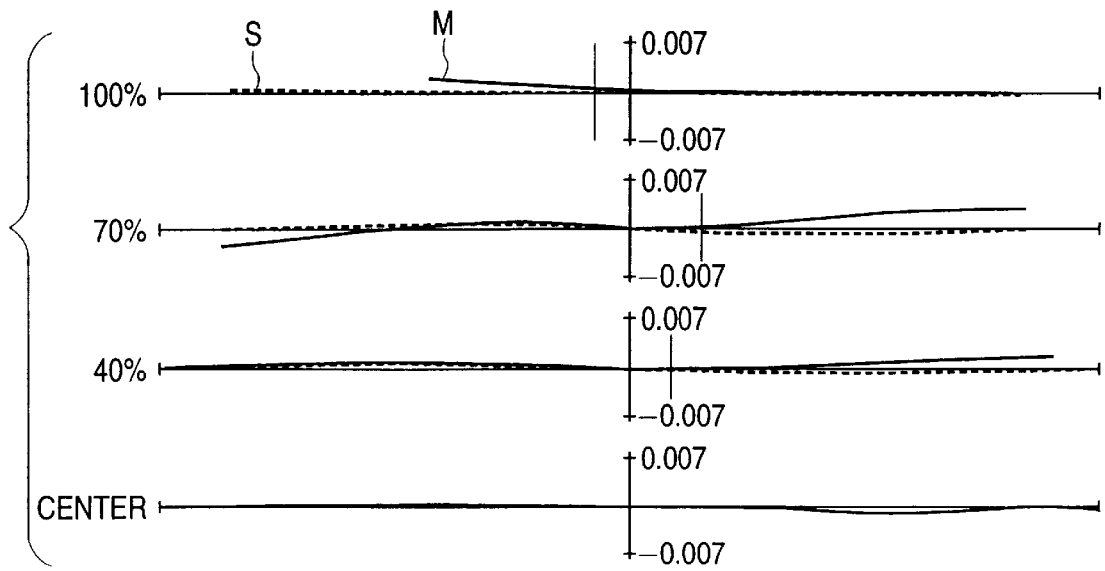
FIGS. 18A, 18B and 18C are graphs each showing various aberrations in the fifth embodiment.
Figure 18B:
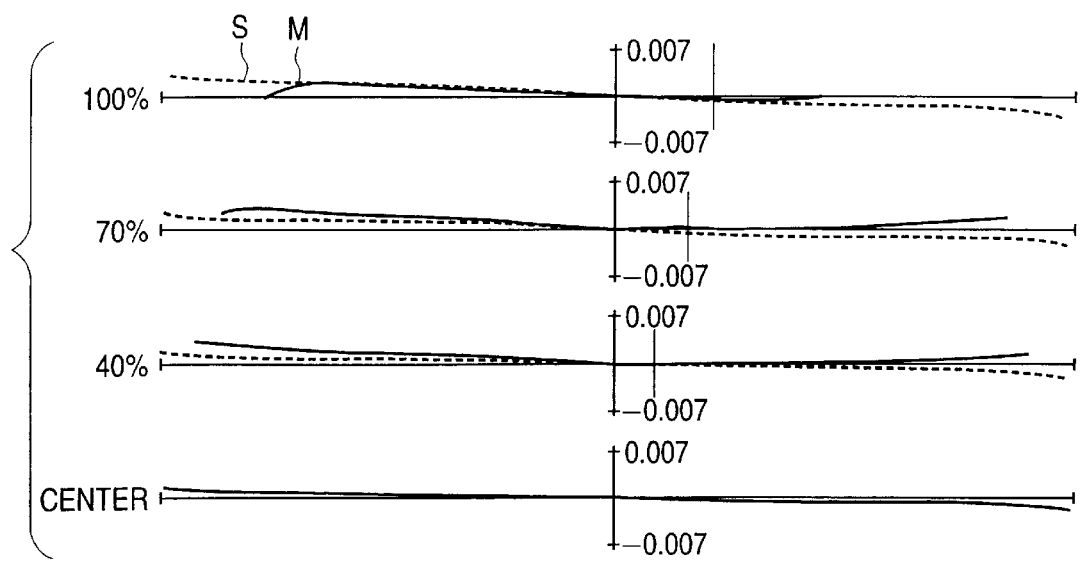
Figure 18C:
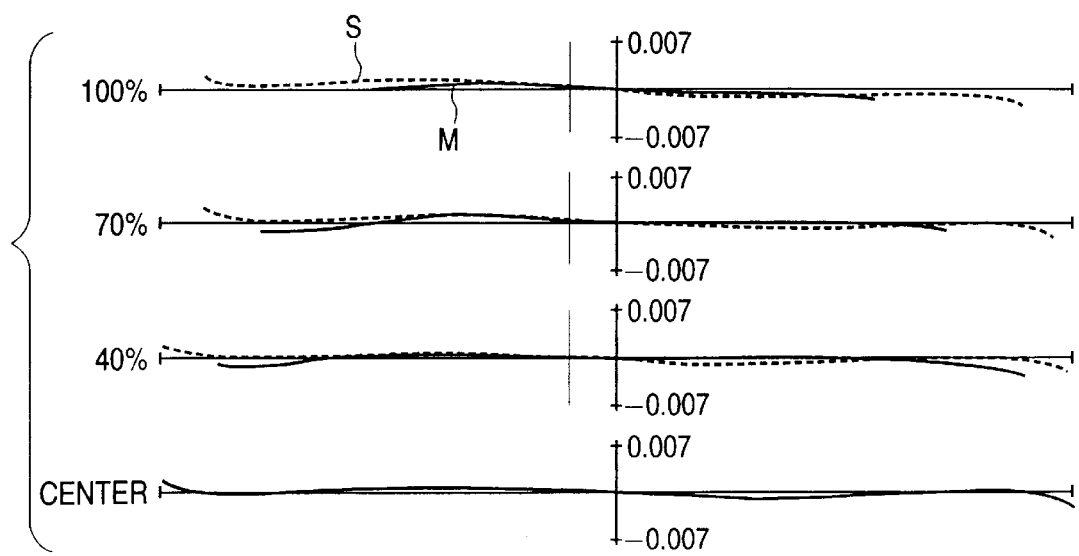
Figure 19A:
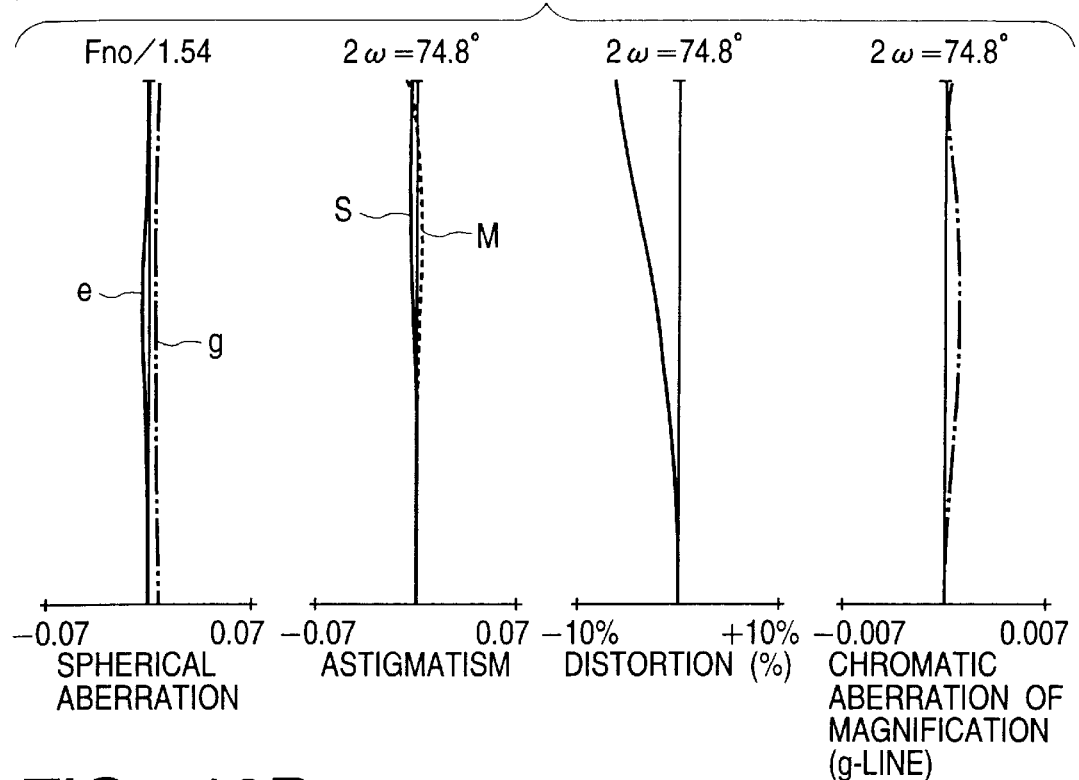
Figure 19B:
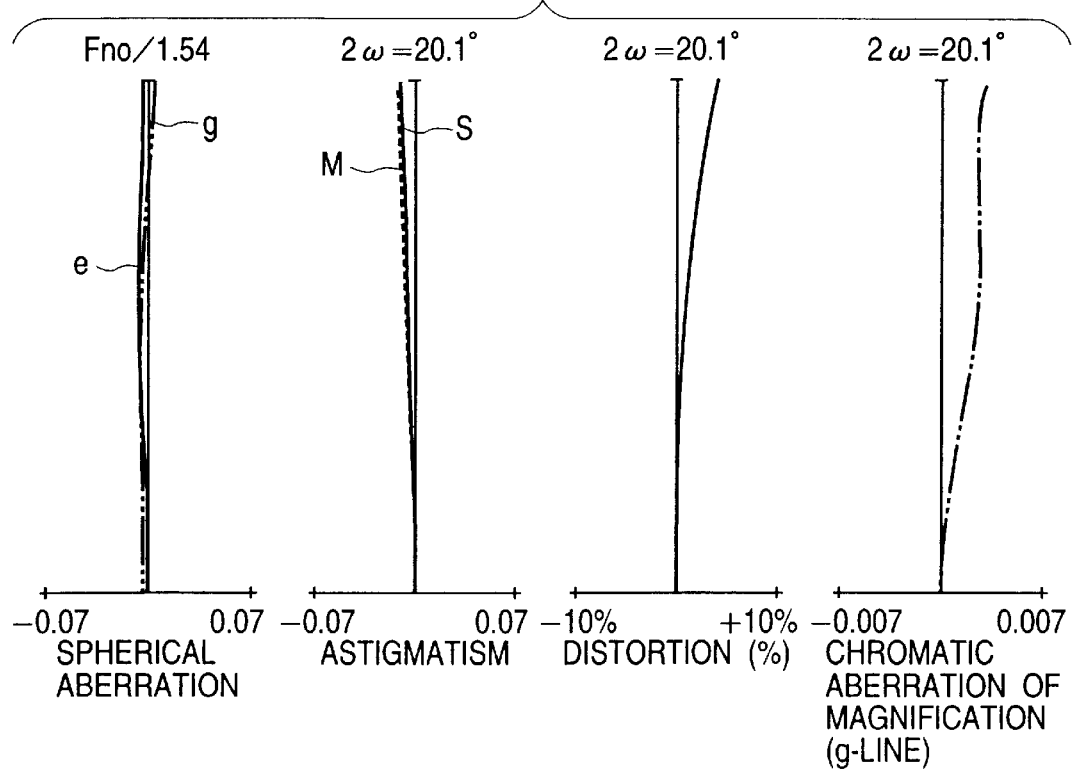
Figure 20B:
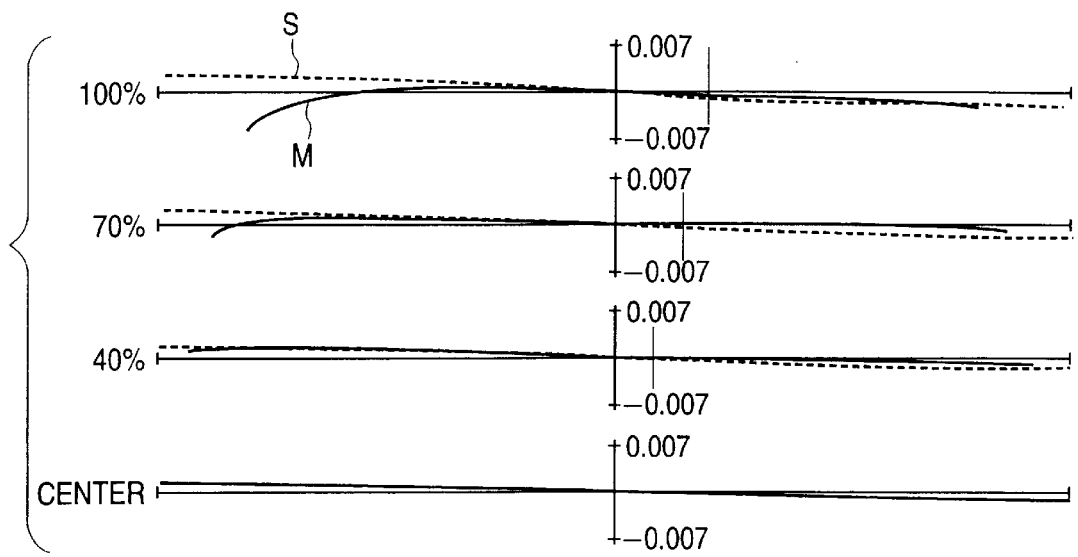
Figure 20C:
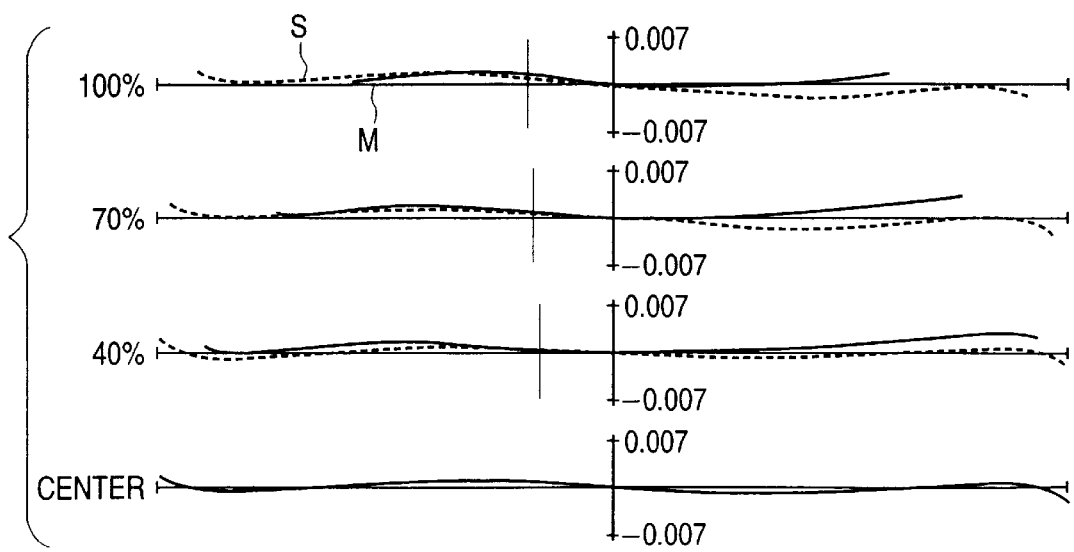
Figure 21A:
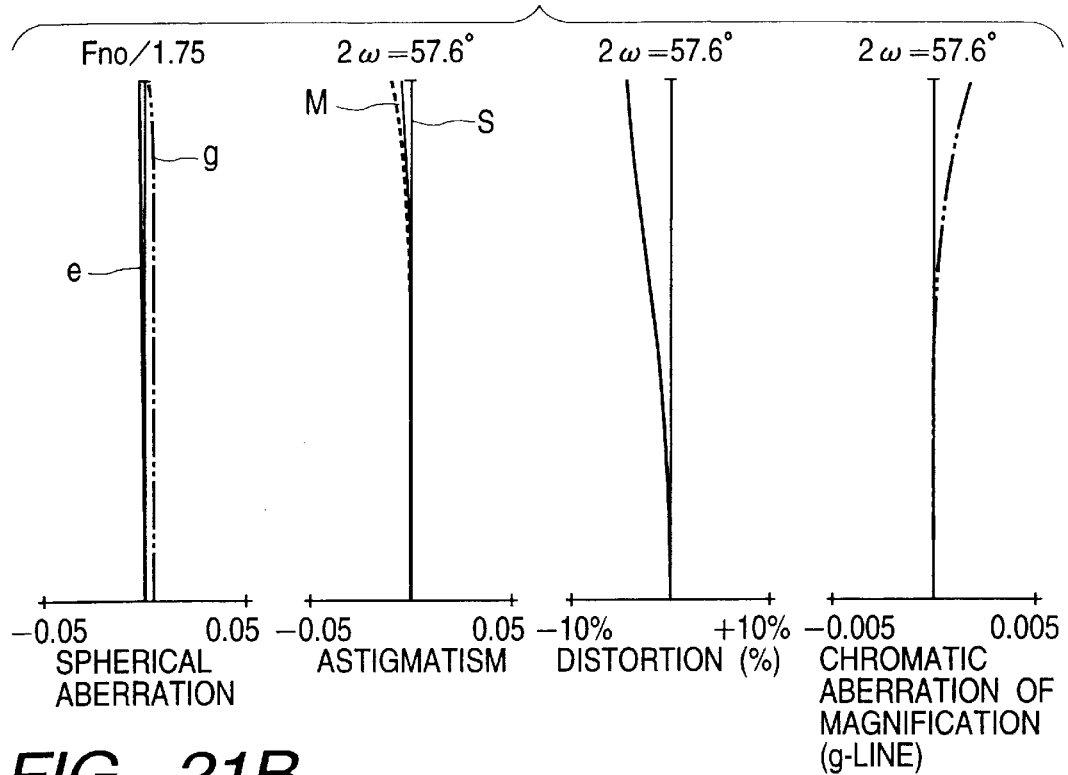
FIGS. 21A, 21B and 21C are graphs each showing various aberrations in the seventh embodiment.
Figure 21B:
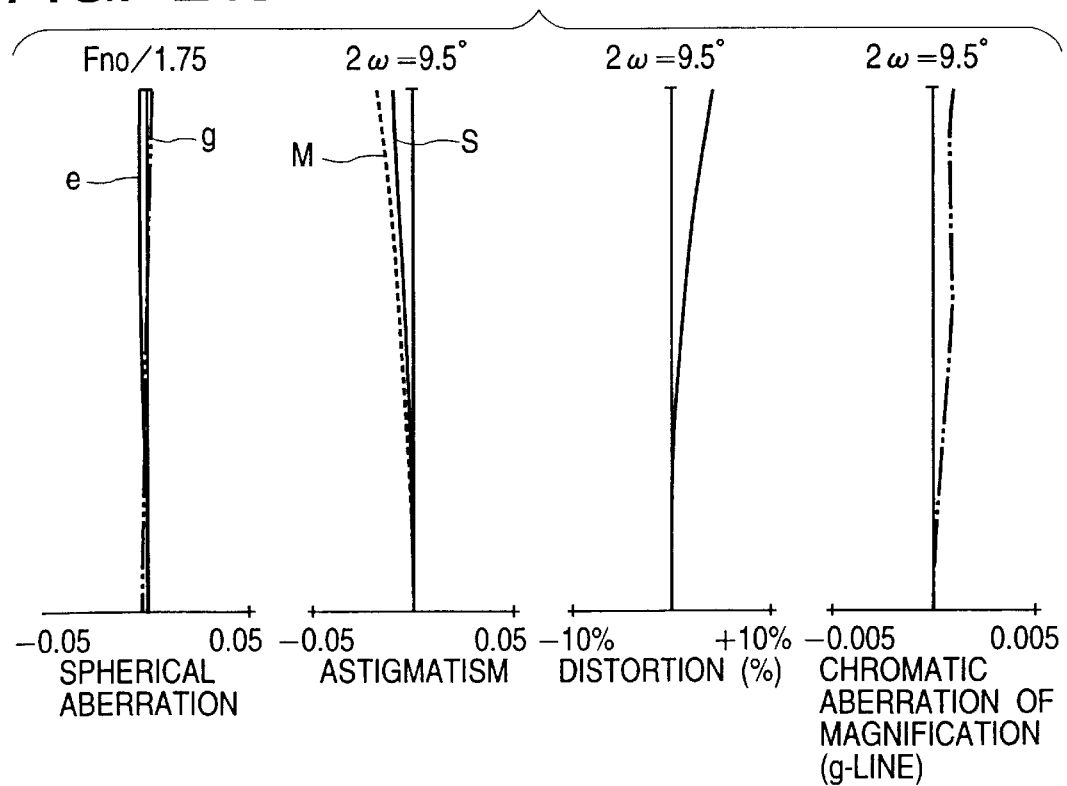
Figure 21C:
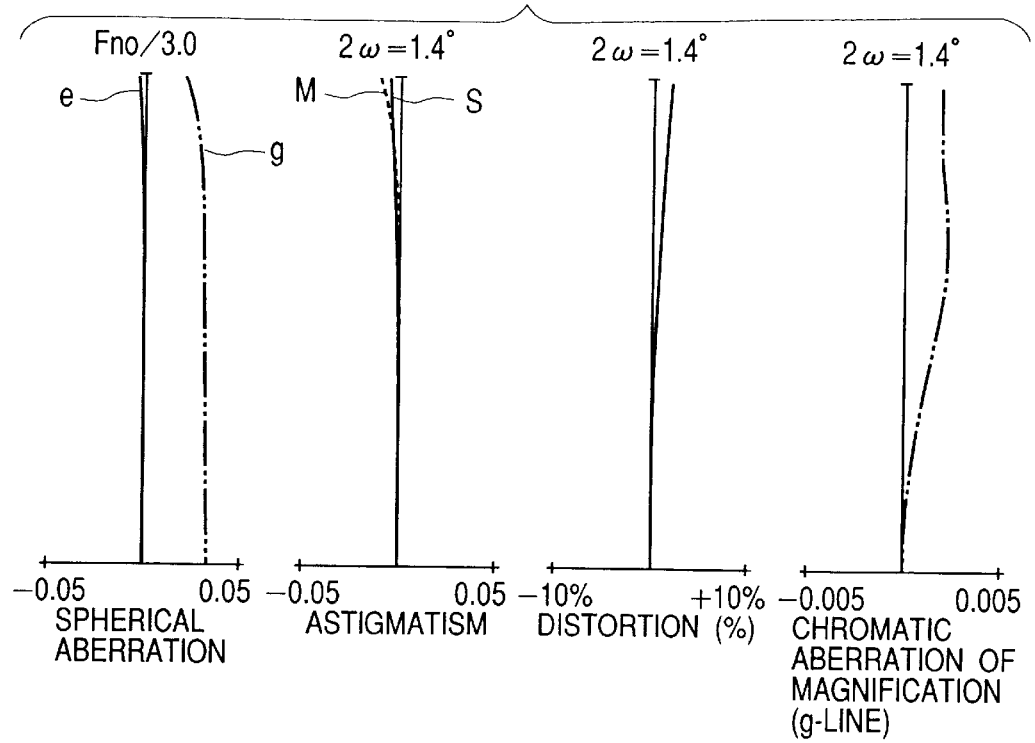
Figure 22A:
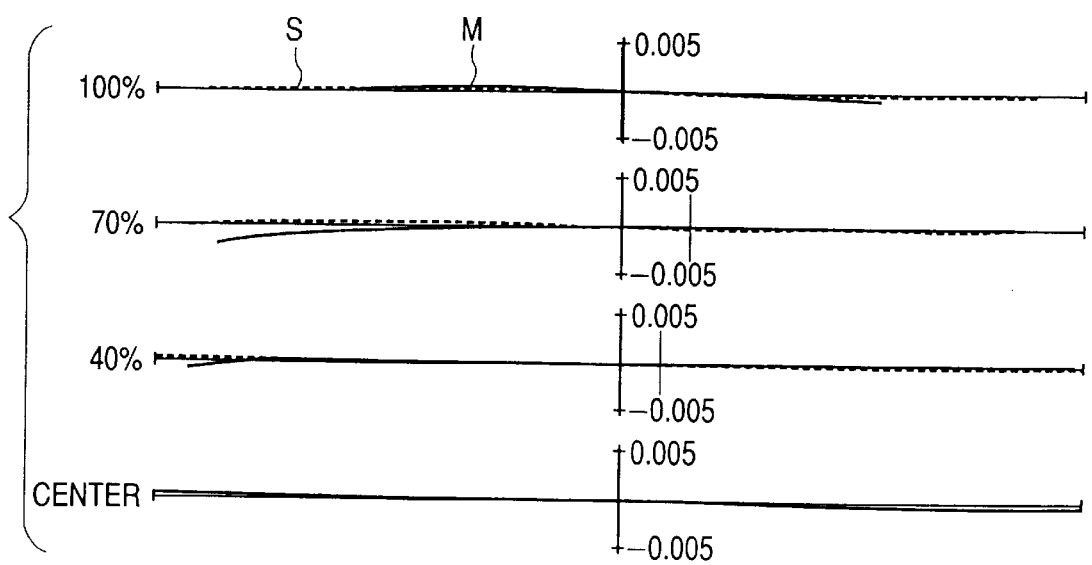
FIGS. 22A, 22B and 22C are graphs each showing various aberrations in the seventh embodiment.
Figure 22B:
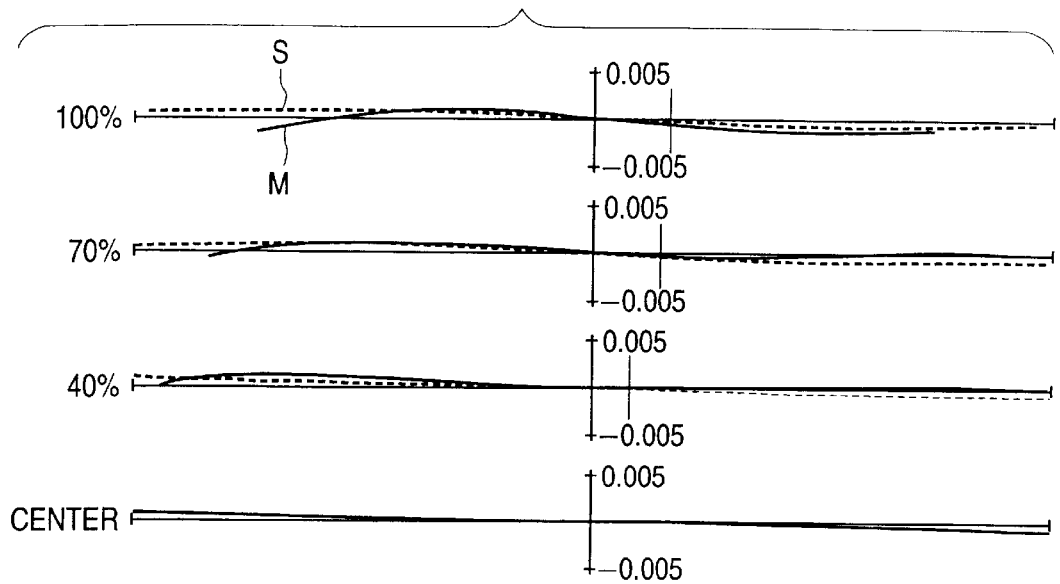
Figure 22C:
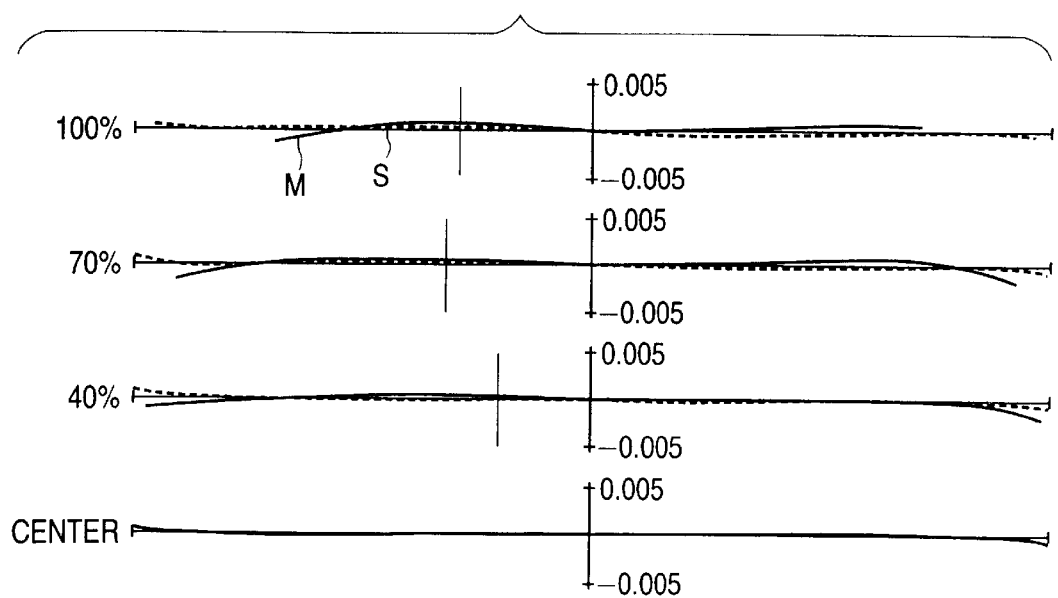
Figure 23A:
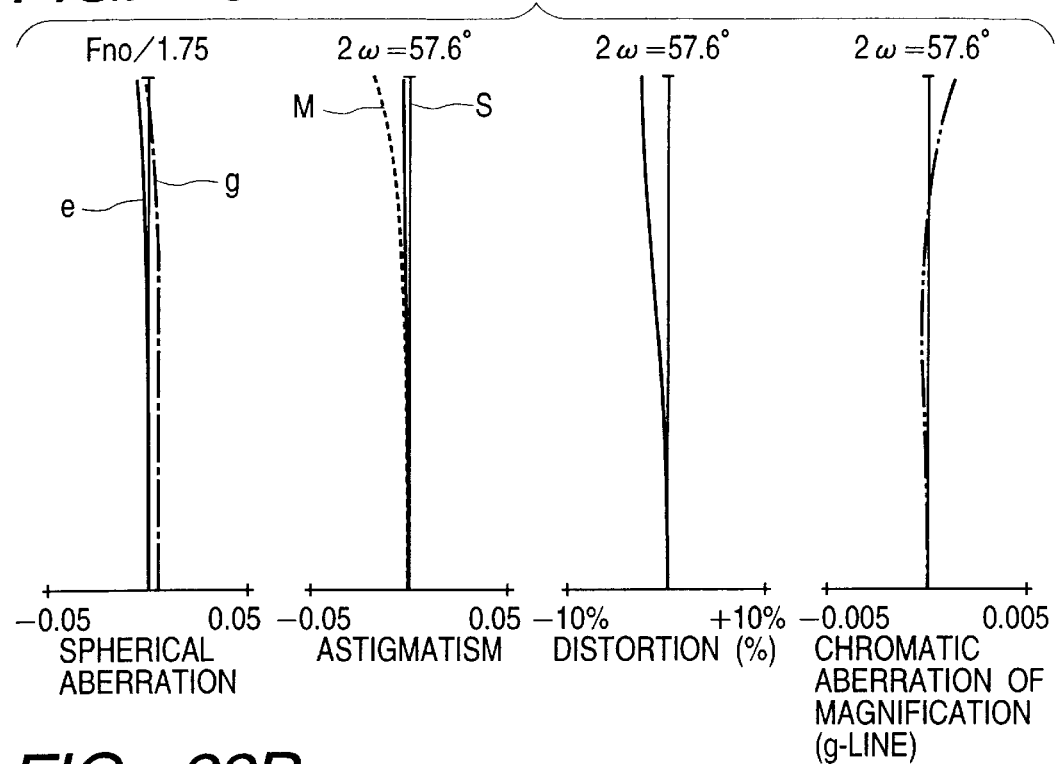
FIGS. 23A, 23B and 23C are graphs each showing various aberrations in the eighth embodiment.
Figure 23B:
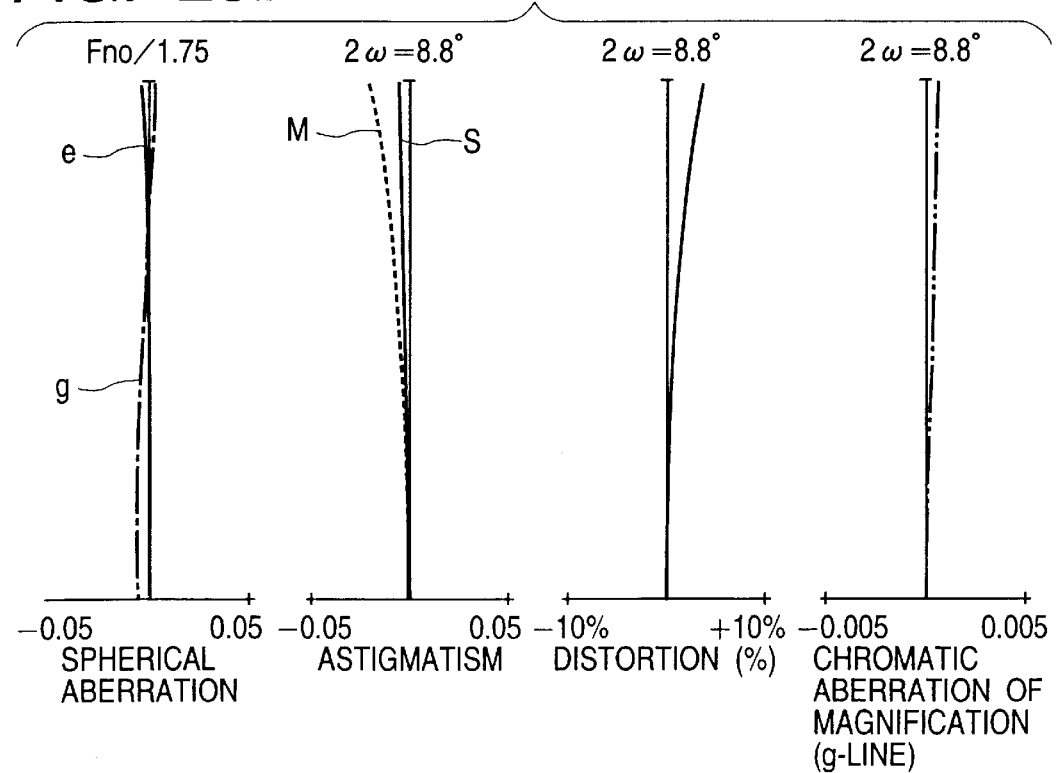
Figure 23C:
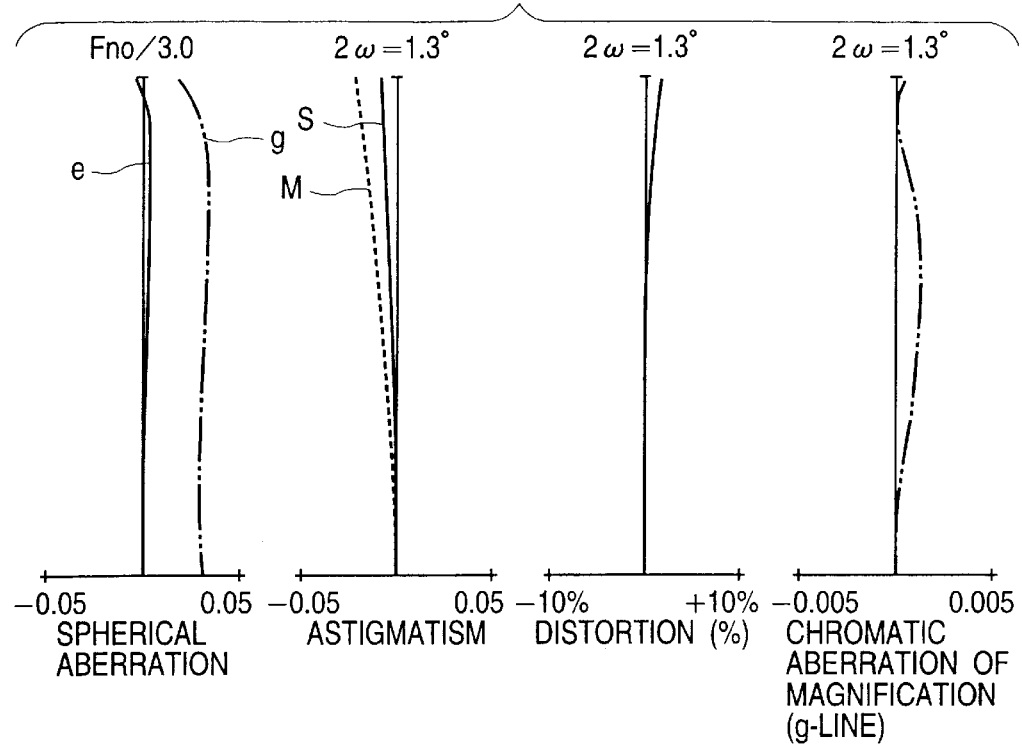
Figure 24A:
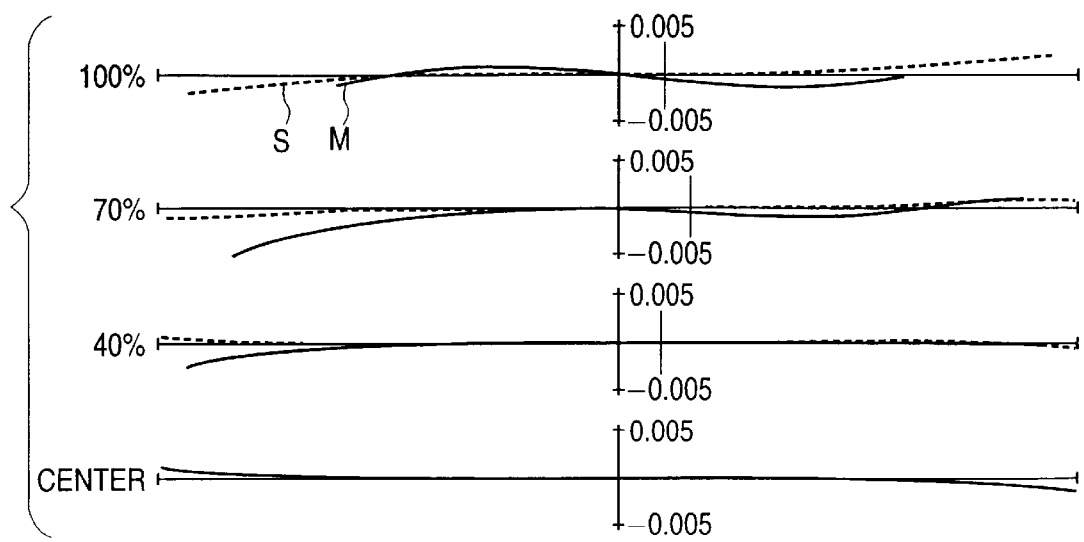
FIGS. 24A, 24B and 24C are graphs each showing various aberrations in the eighth embodiment.
Figure 24B:
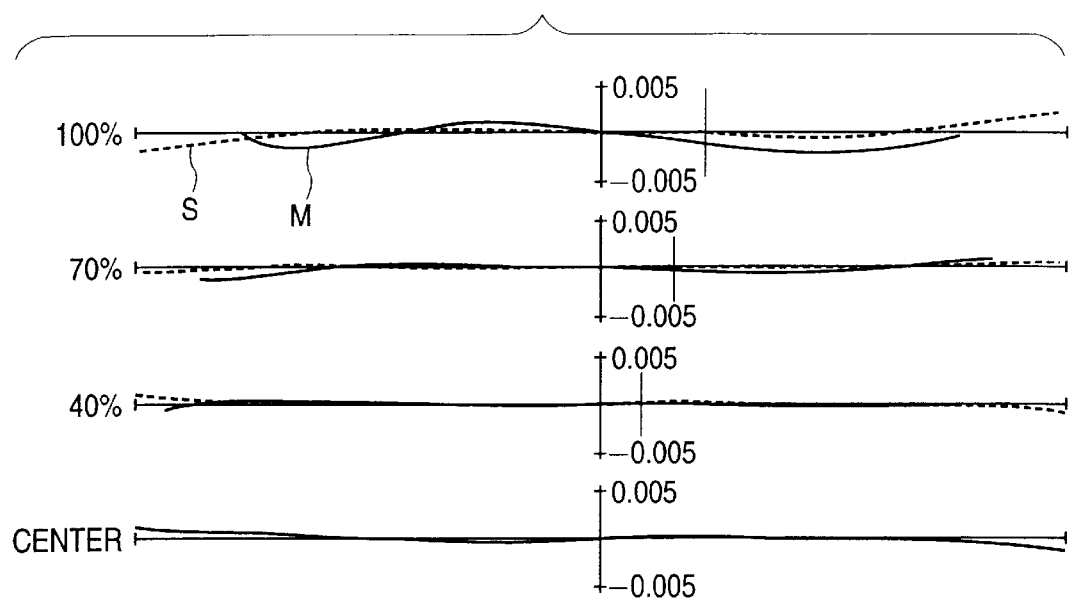
Figure 24C:
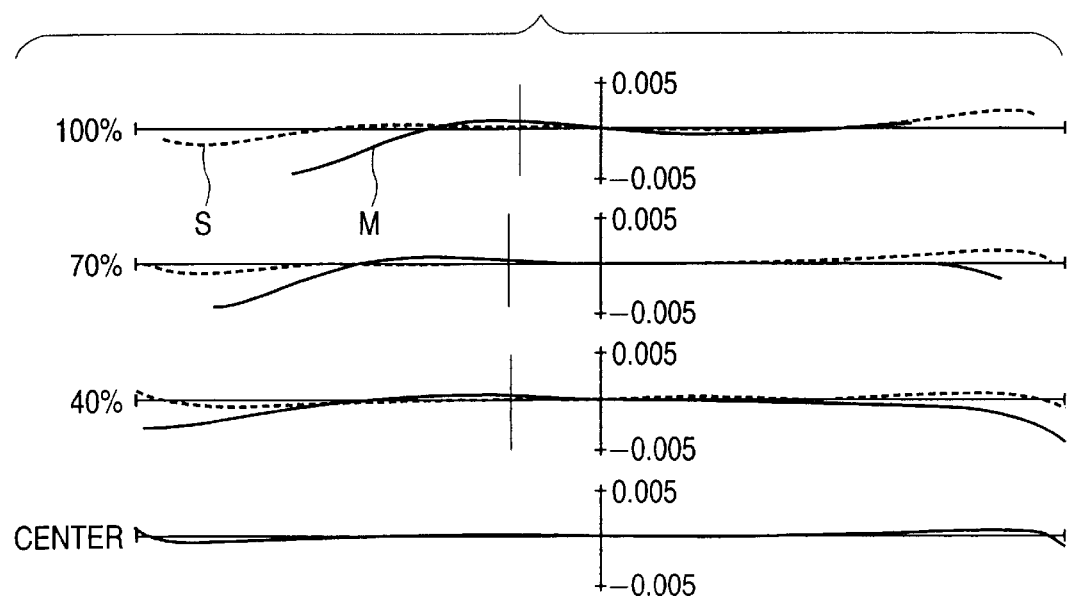
Figure 25:
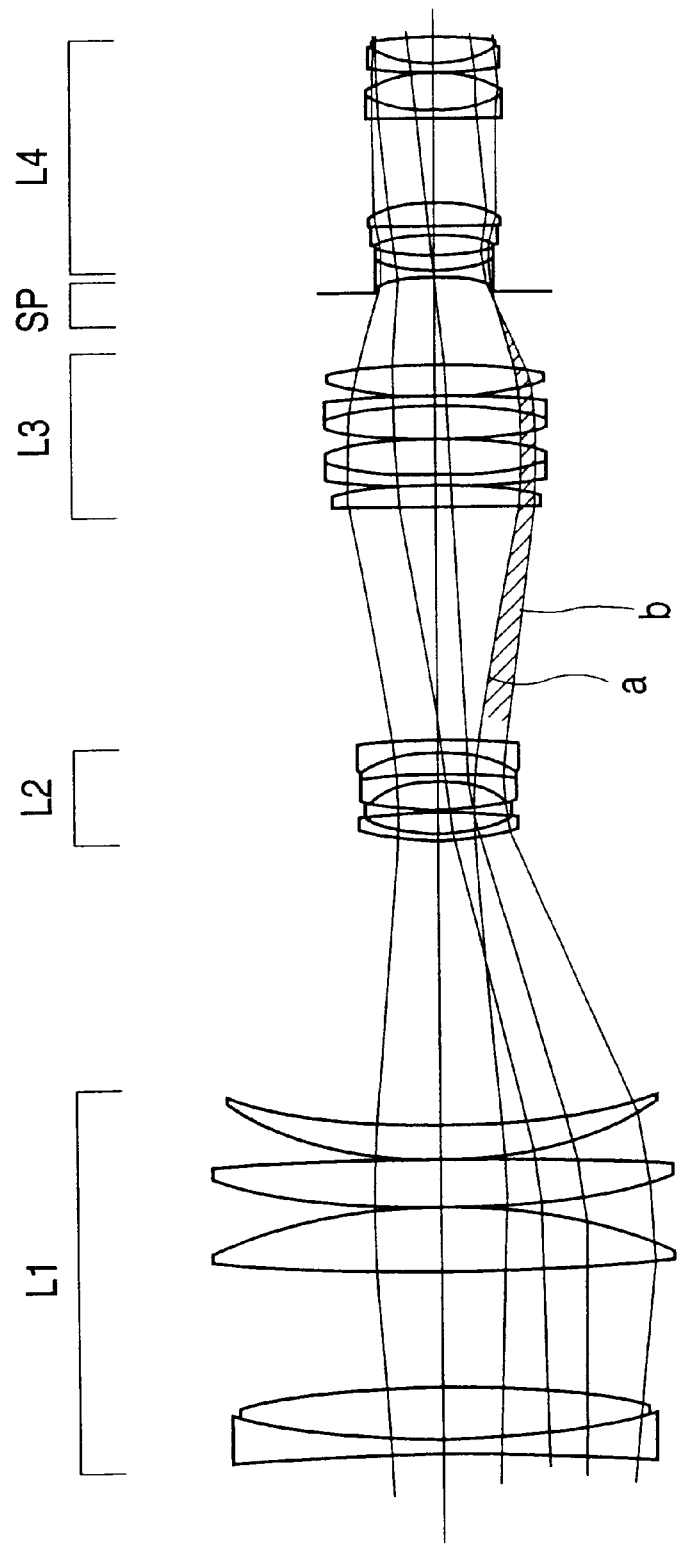
FIG. 25 is a sectional view showing part of the lens system at the intermediate focal length in the first embodiment, together with optical paths.

The present invention will be described in detail below on the basis of the embodiments shown in the accompanying drawings.

FIGS. 1 to 8 are sectional views of the first to eighth embodiments at the wide-angle end. Each embodiment includes a first lens unit L1 having a fixed positive refracting power in a magnifying operation, a second lens unit L2 having a variable negative refracting power in a magnifying operation, a third lens unit L3 having a positive refracting power and used to correct the image surface variations accompanying a magnifying operation, and a fourth lens unit L4 having a positive refracting power and used for imaging. These lens units are arranged in the order named from the object side. Assume that when the imaging magnifications of the second and third lens units L2 and L3 simultaneously pass through a −1-time point in magnifying operation from the wide-angle end to the telephoto end, an intermediate focal length fm is given by $$fm = fw \cdot z^{1/2} \tag{1}$$

where fw is the wide-angle focal length, and z is the magnification ratio. At this intermediate focal length fm, an aspherical surface shaped to decrease a positive refracting power or increase a negative refracting power is provided at a surface that satisfies $$1 < |h3'/h3| \tag{2}$$

where h3 is the height at which an on-axial marginal ray passes, and h3' is the height at which an off-axial marginal ray that is formed into an image at the maximum image height passes.

The first lens unit L1 has a positive refracting power for focusing. The whole or part of the first lens unit L1 is moved to perform focusing. The second lens unit L2 is a variator lens unit having a negative refracting power and is used for magnifying operation. A magnifying operation from the wide-angle end to the telephoto end is performed by monotonously moving the second lens unit L2 toward the image surface on the optical axis. The third lens unit L3 is a compensator lens unit having a positive refracting power and is used to correct image surface variations accompanying the magnifying operation. When the magnifying operation is performed from the wide-angle end to the telephoto end, the third lens unit L3 is nonlinearly moved toward the object.

The second and third lens units L2 and L3 constitute a magnifying system, which performs a magnifying operation by using a range including an imaging magnification of ×−1 (one-to-one). This zoom lens includes a stop SP. The fourth lens unit L4 is a relay unit having a positive refracting power and is used for imaging. The zoom lens also has a glass block G, which is a color separation prism, optical filter, or the like.

In this embodiment, variations in aberrations accompanying magnifying operation, and more specifically, variations in halo/coma, are properly corrected by providing an aspherical surface shaped to decrease a positive refracting power or increase a negative refracting power at at least one surface of a lens element of the compensator lens unit as the third lens unit L3, which has a positive refracting power. This allows the zoom lens to have good optical performance throughout the entire magnification range.

FIGS. 9A to 9C through 24A to 24C are graphs showing longitudinal and lateral aberrations. More specifically, FIGS. 9A, 10A, 11A, 12A, 13A, 14A, 15A, 16A, 17A, 18A, 19A, 20A, 21A, 22A, 23A and 24A show aberrations at the wide-angle end, FIGS. 9B, 10B, 11B, 12B, 13B, 14B, 15B, 16B, 17B, 18B, 19B, 20B, 21B, 22B, 23B and 24B show aberrations at the substantially intermediate focal length position, and FIGS. 9C, 10C, 11C, 12C, 13C, 14C, 15C, 16C, 17C, 18C, 19C, 20C, 21C, 22C, 23C and 24C show aberrations at the telephoto end. Note that each graph shows a sagittal ray S and meridional ray M.

Figure 26:
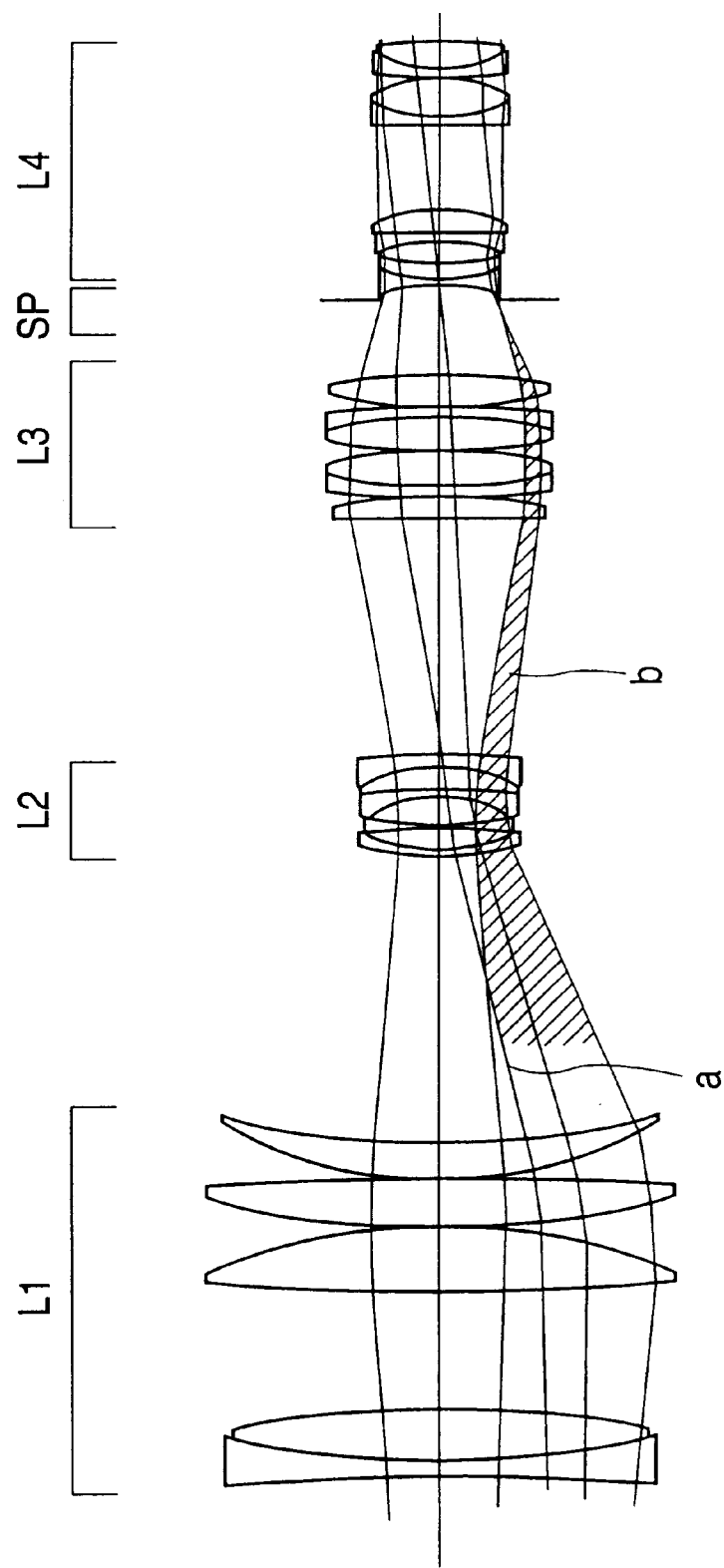
FIG. 26 is a sectional view showing part of the lens system at the intermediate focal length in the fourth embodiment, together with optical paths.

In the above zoom scheme, when a compact zoom lens is designed to suppress an increase in f-number up to the telephoto end and have a large aperture in the entire zoom range, an off-axial marginal ray b travels outside an on-axial marginal ray a at the intermediate focal length position given by equation (1) and the focal length positions before and after the intermediate focal length position, as in the first embodiment shown in FIG. 26. Since the hatched portion of the off-axial marginal ray passes through widely below the on-axial marginal ray, it is difficult to correct halo/coma. This makes it difficult to attain high performance. For this reason, such an aberration is corrected by providing an aspherical surface that satisfies condition (2).

Note that rays are vignetted in the above focal length range. For this reason, in order to cancel out outward halo/coma on the image surface, when an aspherical surface is provided at a convex surface, the aspherical surface is shaped to decrease the curvature of the peripheral portion with respect to the curvature of the central portion. When an aspherical surface is provided at a convex surface, the aspherical surface is shaped to increase the curvature of the peripheral portion with respect to the curvature of the central portion.

The third lens unit L3 is preferably made up of at least three convex lenses and at least one concave lens and satisfies the following conditions:

$$0.5 \leq f3/D3 \leq 1.5 \quad (3)$$

$$1.45 \leq n3 \leq 1.65 \quad (4)$$

$$55 \leq v3 \leq 85 \quad (5)$$

where f3 is the focal length of the third lens unit L3, D3 is the maximum aperture, n3 is the average refractive index of each convex lens, and v3 is the average Abbe's number of the convex lenses.

Conditions (3), (4), and (5) define the configuration of the third lens unit L3. If the third lens unit L3 does not hold conditions (3), (4), and (5), it is difficult to correct the balance between a spherical aberration and an off-axial aberration and variations in longitudinal chromatic aberration and lateral chromatic aberration.

Assume that the second and third lens units L2 and L3 move in directions to reduce the distance therebetween, i.e., the second and third lens units respective monotonously move toward the image surface side and object side, in a magnifying operation from the wide-angle end to the telephoto end. In this case, the following conditions are preferably satisfied:

$$1.6 \leq m2/m3 \leq 3.0 \quad (6)$$

$$0.3 \leq \beta2/\beta3 \leq 1.2 \quad (7)$$

where m2 and m3 are the total moving amounts of the second and third lens units L2 and L3 from the wide-angle end to the telephoto end, and β2 and β3 are the lateral magnifications at the wide-angle end.

Conditions (6) and (7) define the balance between the refracting powers of the second and third lens units L2 and L3 constituting a zooming portion. With a zooming portion deviating from conditions (6) and (7), the refracting power of one lens unit becomes extremely higher than that of the other lens unit. This makes it more difficult to correct aberrations. In addition, the refracting powers of the first and fourth lens units L1 and L4 become extremely high. For this reason, it becomes difficult to correct variations in various aberrations in the entire magnification range and entire object distance range when the magnification ratio is to be increased.

As is obvious from FIGS. 10A to 10C, 12A to 12C, 14A to 14C, 16A to 16C, 18A to 18C, 20A to 20C, 22A to 22C and 24A to 24C, halo/coma is properly corrected in spite of the fact that the underside off-axial marginal ray passes through widely by the (sub) principal ray, at the substantially intermediate focal length position (in each of FIGS. 10B, 12B, 14B, 16B, 18B, 20B, 22B and 24B), in particular, up to the maximum image height in comparison with the on-axial ray. Obviously, variations in various aberrations from the wide-angle end to the telephoto end are slight, i.e., are properly corrected.

In the third embodiment, aberrations are properly corrected by providing aspherical surfaces at both a surface close to the object side and a surface close to the stop in the third lens unit L3, although the arrangement of the third lens unit L3 in the third embodiment is simpler than that in the second embodiment.

In the fourth embodiment, in contrast to the first embodiment, in order to correct distortion that is difficult to correct as the angle of view increases, and more specifically, barrel distortion at the wide-angle end, an aspherical surface shaped to reduce a negative refracting power is formed in the second lens unit L2. As is obvious from FIG. 26, however, at the substantially intermediate focal length position, in the second lens unit L2, the off-axial marginal ray passes through outside the on-axial marginal ray b as in the third lens unit L3.

If an aspherical surface shaped to reduce a negative refracting power is formed, halo/coma increases in the substantially intermediate focal length range. If, therefore, such an aspherical surface is formed in only the second lens unit L2, it is difficult to provide a sufficient deviation to correct distortion satisfactorily. For this reason, aberrations can be effectively corrected by providing aspherical surfaces for both the second and third lens units L2 and L3. In addition, aberrations can be more effectively corrected by providing aspherical surfaces at three surfaces spaced apart from each other, i.e., a surface in the second lens unit L2 that is close to the object and surfaces in the third lens unit L3 that are close to the object and stop, respectively.

As is also obvious from the aberrations, the fourth embodiment can correct barrel distortion more properly than the first embodiment, and also correct other aberration variations properly.

In contrast to the first embodiment, the fifth embodiment exemplifies the case wherein the refracting power of the third lens unit L3 is increased, and the moving amount of the third lens unit L3 is set to be small relative to the third lens unit L3. If the refracting power of the third lens unit L3 is further increased to exceed the upper limit defined by condition (6), the aberration variation caused in the third lens unit L3 is difficult to correct.

In contrast to the first embodiment, in the sixth embodiment, the refracting power of the third lens unit L3 is reduced, and the moving amount of the third lens unit L3 is set to be larger than that of the second lens unit L2. If the refracting power of the third lens unit L3 is further reduced below the lower limit defined by condition (6), the refracting power of the first lens unit L1 tends to increase as the refracting power of the third lens unit L3 decreases. This makes it difficult to correct aberrations on the telephoto end, in particular. That is, this arrangement is not appropriate.

The seventh embodiment attains higher zoom ratio than other embodiments described above.

In the eighth embodiment, the magnification ratio is 50 times higher than that in the seventh embodiment. As is apparent, aberrations are properly corrected from the wide-angle end to the telephoto end in spite of a large f-number of 3.0 at the telephoto end, i.e., a large aperture.

In all the embodiments described above, the off-axial marginal ray, which is formed into an image at the maximum image height at the substantially intermediate focal length position, passes through below the on-axial marginal ray throughout all the surfaces in the third lens unit L3. All the surfaces in the third lens unit L3 meet condition (2). When the performance of the zoom lens is decreased by decreasing the zoom ratio, increasing the f-number at the telephoto end with respect to the f-number at the wide-angle end, i.e., increasing amount of the F drop, the surfaces begin to deviate from condition (2), starting from the surface nearest to the stop SP. If an aspherical surface is provided at a surface holding no condition (2), a satisfactory effect cannot be obtained.

If the refracting power of the second lens unit L2 is decreased while the specifications, e.g., the zoom ratio and f-number, remain unchanged, all or some of surfaces in the third lens unit L3 do not hold condition (2) in the substantially intermediate focal length range even within the range defined by relation (6). In this case, however, aberration correction in the intermediate focal length range is facilitated. This arrangement, however, is not suitable for a reduction in the total length of the lens system because the moving amount of the second lens unit L2 increases.

In this embodiment, an aspherical surface is provided at the lens element of the third lens unit L3 that is nearest to the object but may be provided at the second or subsequent lens element from the object side. However, such an arrangement is not suitable for correcting off-axial aberrations because the difference between the positions where on-axial and off-axial ray pass decreases. When two or more aspherical surfaces are used in the third lens unit L3, these surfaces are preferably formed at positions as distant from each other as possible for the sake of aberration correction.

In this embodiment, the aspherical surfaces are provided at one or two surfaces of the third lens unit L3 and one surface of the second lens unit L2. As is obvious, however, if aspherical surfaces are provided at more surfaces including the first and fourth lens units L1 and L4, aberrations can be corrected more properly.

Assume that the X-axis is set in the optical axis direction, the H-axis is set in a direction perpendicular to the optical axis, and the traveling direction of light is a positive direction. In this case, an aspherical surface can be given by $$X = \{(1/R)H^2\}/\{1+(1-(H/R)^2)^{1/2} + AH^2 + BH^4 + CH^6 + DH^8 + EH^{10}$$

where R is the paraxial radius of curvature, and A, B, C, D, and E are aspherical surface coefficients.

Numerical embodiments 1 to 8 in the first to eighth embodiments will be presented next. In each numeral embodiment, ri represents the radius of curvature of the ith lens surface from the object side; di, the interval between the thickness of the ith lens and the air; and ni and vi, the refractive index and Abbe's number of the ith lens from the object. Note that "*" represents an aspherical surface.

Numeral Embodiment 1

| f = 1 to 18.5 | fno = 1:1.54 to 1.85 | | 2ω = 74.8° to 4.7° |
|---|---|---|---|
| r1 = 49.862 | d1 = 0.65 | n1 = 1.77621 | v1 = 49.6 |
| r2 = 13.762 | d2 = 4.88 | | |
| r3 = −23.059 | d3 = 0.63 | n2 = 1.77621 | v2 = 49.6 |
| r4 = −188.695 | d4 = 0.02 | | |
| r5 = 32.949 | d5 = 1.29 | n3 = 1.72311 | v3 = 29.5 |
| r6 = 71.051 | d6 = 1.33 | | |
| r7 = −190.950 | d7 = 2.06 | n4 = 1.49845 | v4 = 81.5 |
| r8 = −21.373 | d8 = 0.03 | | |
| r9 = −107.821 | d9 = 0.61 | n5 = 1.81265 | v5 = 25.4 |
| r10 = 41.415 | d10 = 1.82 | n6 = 1.49845 | v6 = 81.5 |
| r11 = −45.551 | d11 = 4.83 | | |
| r12 = 94.551 | d12 = 2.46 | n7 = 1.49845 | v7 = 81.5 |
| r13 = −24.866 | d13 = 0.02 | | |
| r14 = 30.491 | d14 = 1.80 | n8 = 1.49845 | v8 = 81.5 |
| r15 = −219.481 | d15 = 0.02 | | |
| r16 = 17.523 | d16 = 1.35 | n9 = 1.62286 | v9 = 60.3 |
| r17 = 33.921 | d17 = variable | | |
| r18 = 12.322 | d18 = 0.21 | n10 = 1.88815 | v10 = 40.8 |
| r19 = 6.368 | d19 = 0.84 | | |
| r20 = −45.305 | d20 = 0.21 | n11 = 1.77621 | v11 = 49.6 |
| r21 = 15.856 | d21 = 0.84 | | |
| r22 = −7.545 | d22 = 0.21 | n12 = 1.77621 | v12 = 49.6 |
| r23 = −103.127 | d23 = 1.15 | n13 = 1.81643 | v13 = 22.8 |
| r24 = −5.535 | d24 = 0.10 | | |
| r25 = −5.196 | d25 = 0.21 | n14 = 1.82017 | v14 = 46.6 |
| r26 = −41.145 | d26 = variable | | |
| r27 = −113.693 | d27 = 0.70 | n15 = 1.50014 | vlS = 65.0 |
| *r28 = −14.200 | d28 = 0.03 | | |
| r29 = 37.596 | d29 = 0.35 | n16 = 1.65223 | v16 = 33.8 |
| r30 = 8.470 | d30 = 1.81 | n17 = 1.59143 | v17 = 61.2 |
| r31 = −21.519 | d31 = 0.03 | | |
| r32 = 24.657 | d32 = 1.26 | n18 = 1.60548 | v18 = 60.7 |
| r33 = −15.546 | d33 = 0.35 | n19 = 1.85501 | v19 = 23.9 |
| r34 = −34.178 | d34 = 0.03 | | |
| r35 = 18.179 | d35 = 1.22 | n20 = 1.48915 | v20 = 70.2 |
| r36 = −22.489 | d36 = variable | | |
| r37 = ∞(stop) | d37 = 0.49 | | |

-continued

| f = 1 to 18.5 | fno = 1:1.54 to 1.85 | 2ω = 74.8° to 4.7° | |
|---|---|---|---|
| r38 = −7.463 | d38 = 0.21 | n21 = 1.73234 | v21 = 54.7 |
| r39 = 5.356 | d39 = 0.67 | n22 = 1.85504 | v22 = 23.8 |
| r40 = 11.390 | d40 = 0.90 | | |
| r41 = −5.245 | d41 = 0.25 | n23 = 1.75844 | v23 = 52.3 |
| r42 = 17.504 | d42 = 1.22 | n24 = 1.73429 | v24 = 28.5 |
| r43 = −5.102 | d43 = 3.13 | | |
| r44 = −26.094 | d44 = 0.25 | n25 = 1.75844 | v25 = 52.3 |
| r45 = 4.420 | d45 = 1.51 | n26 = 1.55098 | v26 = 45.8 |
| r46 = −6.168 | d46 = 0.03 | | |
| r47 = 15.986 | d47 = 0.25 | n27 = 1.83932 | v27 = 37.2 |
| r48 = 4.258 | d48 = 1.08 | n28 = 1.48915 | v28 = 70.2 |
| r49 = −27.005 | d49 = 0.03 | | |
| r50 = 20.349 | d50 = 1.18 | n29 = 1.49845 | v29 = 81.5 |
| r51 = −4.514 | d51 = 0.25 | n30 = 1.81264 | v30 = 25.4 |
| r52 = −19.461 | d52 = 0.07 | | |
| r53 = 12.240 | d53 = 1.22 | n31 = 1.48915 | v31 = 70.2 |
| r54 = −5.240 | d54 = 0.69 | | |
| r55 = ∞ | d55 = 6.94 | n32 = 1.51825 | v32 = 64.2 |
| r56 = ∞ | | | |

Focal Length

| variable interval | 1.00 | 4.41 | 18.50 |
|---|---|---|---|
| d17 | 0.73 | 10.45 | 14.66 |
| d26 | 20.68 | 8.74 | 0.61 |
| d36 | 0.30 | 2.51 | 6.44 |

Aspherical Shape
28th Surface
R=−14.20 A=0 B=8.279·$10^{-5}$
C=5.452·$10^{-6}$ D=−3.901·$10^{-7}$ E=1.102·$10^{-8}$ Numeral Embodiment 2

| f = 1 to 44 | fno = 1:1.7 to 3.0 | 2ω = 57.6° to 1.4° | |
|---|---|---|---|
| r1 = 37.0170 | d1 = 0.5500 | n1 = 1.72311 | v1 = 29.5 |
| r2 = 17.9081 | d2 = 0.0469 | | |
| r3 = 17.7086 | d3 = 2.1525 | n2 = 1.43496 | v2 = 95.1 |
| r4 = −73.8246 | d4 = 0.0300 | | |
| r5 = 17.9834 | d5 = 1.6936 | n3 = 1.43496 | v3 = 95.1 |
| r6 = −1848.4355 | d6 = 0.0300 | | |
| r7 = 13.6803 | d7 = 1.1611 | n4 = 1.49845 | v4 = 81.6 |
| r8 = 29.9938 | d8 = variable | | |
| r9 = 206.4706 | d9 = 0.2000 | n5 = 1.82017 | v5 = 46.6 |
| r10 = 5.6194 | d10 = 0.4929 | | |
| r11 = −20.0836 | d11 = 0.1800 | n6 = 1.77621 | v6 = 49.6 |
| r12 = 5.8527 | d12 = 0.5921 | | |
| r13 = −7.0671 | d13 = 0.1800 | n7 = 1.82017 | v7 = 46.6 |
| r14 = 4.7059 | d14 = 0.7606 | n8 = 1.93306 | v8 = 21.3 |
| r15 = −74.1457 | d15 = variable | | |
| r16 = −328.6891 | d16 = 0.6088 | n9 = 1.50014 | v9 = 65.0 |
| *r17 = −10.0506 | d17 = 0.0300 | | |
| r18 = 18.1499 | d18 = 0.2500 | n10 = 1.65223 | v10 = 33.8 |
| r19 = 8.0299 | d19 = 1.1317 | n11 = 1.59143 | v11 = 61.2 |
| r20 = −16.0387 | d20 = 0.0200 | | |
| r21 = 15.3942 | d21 = 1.1394 | n12 = 1.60548 | v12 = 60.7 |
| r22 = −7.8774 | d22 = 0.2500 | n13 = 1.85501 | v13 = 23.9 |
| r23 = −21.0812 | d23 = 0.0200 | | |
| r24 = 12.6384 | d24 = 0.7219 | n14 = 1.48915 | v14 = 70.2 |
| r25 = −51.1899 | d25 = variable | | |
| r26 = ∞(stop) | d26 = 0.3104 | | |
| r27 = −4.8435 | d27 = 0.1800 | n15 = 1.79013 | v15 = 44.2 |
| r28 = 3.6441 | d28 = 0.4854 | n16 = 1.81265 | v16 = 25.4 |
| r29 = 14.4120 | d29 = 0.5859 | | |
| r30 = −4.1658 | d30 = 0.1600 | n17 = 1.73234 | v17 = 54.7 |
| r31 = 3.8093 | d31 = 1.1220 | n18 = 1.59911 | v18 = 39.2 |

-continued

| f = 1 to 44 | fno = 1:1.7 to 3.0 | 2ω = 57.6° to 1.4° | |
|---|---|---|---|
| r32 = −2.9854 | d32 = 2.4000 | | |
| r33 = 57.6331 | d33 = 0.7605 | n19 = 1.48915 | v19 = 70.2 |
| r34 = −3.4501 | d34 = 0.0200 | | |
| r35 = −5.0880 | d35 = 0.2200 | n20 = 1.79013 | v20 = 44.2 |
| r36 = 3.9587 | d36 = 0.6740 | n21 = 1.50349 | v21 = 56.4 |
| r37 = −5.8431 | d37 = 0.1100 | | |
| r38 = −24.6798 | d38 = 0.6293 | n22 = 1.55099 | v22 = 45.8 |
| r39 = −2.6527 | d39 = 0.2200 | n23 = 1.81265 | v23 = 25.4 |
| r40 = −6.4354 | d40 = 0.0200 | | |
| r41 = 6.2443 | d41 = 0.6634 | n24 = 1.51977 | v24 = 52.4 |
| r42 = −7.0927 | d42 = 0.5000 | | |
| r43 = ∞ | d43 = 5.0000 | n25 = 1.51825 | v25 = 64.2 |
| r44 = ∞ | | | |

Focal Length

| variable interval | 1.00 | 6.48 | 44.00 |
|---|---|---|---|
| d 8 | 0.49 | 9.29 | 12.39 |
| d15 | 17.89 | 7.27 | 0.30 |
| d25 | 0.33 | 2.15 | 6.03 |

Aspherical Shape
17th Surface
R=−10.0506 A=0 B=5.058·$10^{-5}$
C=4.272·$10^{-7}$ D=2.699·$10^{-7}$ E=−2.559·$10^{-8}$ Numeral Embodiment 3

| f = 1 to 44 | fno = 1:1.7 to 3.0 | 2ω = 57.6° to 1.4° | |
|---|---|---|---|
| r1 = 37.2898 | d1 = 0.5500 | n1 = 1.72311 | v1 = 29.5 |
| r2 = 17.6786 | d2 = 0.0435 | | |
| r3 = 17.4712 | d3 = 2.1207 | n2 = 1.43496 | v2 = 95.1 |
| r4 = −83.9289 | d4 = 0.0300 | | |
| r5 = 18.8748 | d5 = 1.7421 | n3 = 1.43496 | v3 = 95.1 |
| r6 = −268.0807 | d6 = 0.0300 | | |
| r7 = 13.4097 | d7 = 1.3166 | n4 = 1.49845 | v4 = 81.6 |
| r8 = 29.9324 | d8 = variable | | |
| r9 = 165.6239 | d9 = 0.2000 | n5 = 1.82017 | v5 = 46.6 |
| r10 = 5.6122 | d10 = 0.5797 | | |
| r11 = −22.5184 | d11 = 0.1800 | n6 = 1.77621 | v6 = 49.6 |
| r12 = 5.8492 | d12 = 0.6027 | | |
| r13 = −6.9878 | d13 = 0.1800 | n7 = 1.82017 | v7 = 46.6 |
| r14 = 4.7304 | d14 = 0.7920 | n8 = 1.93306 | v8 = 21.3 |
| r15 = −76.1306 | d15 = variable | | |
| r16 = 25.8174 | d16 = 1.0708 | n9 = 1.48915 | v9 = 70.2 |
| *r17 = −8.1836 | d17 = 0.0236 | | |
| r18 = 15.2140 | d18 = 1.5529 | n10 = 1.64254 | v10 = 60.1 |
| r19 = −5.6867 | d19 = 0.1970 | n11 = 1.81264 | v11 = 25.4 |
| r20 = −14.3668 | d20 = 0.0158 | | |
| *r21 = 11.0730 | d21 = 0.9104 | n12 = 1.48915 | v12 = 70.2 |
| r22 = −29.9975 | d22 = variable | | |
| r23 = ∞(stop) | d23 = 0.3675 | | |
| r24 = −4.1807 | d24 = 0.1800 | n13 = 1.79013 | v13 = 44.2 |
| r25 = 4.3616 | d25 = 0.4501 | n14 = 1.81265 | v14 = 25.4 |
| r26 = 16.4495 | d26 = 0.4944 | | |
| r27 = −5.5526 | d27 = 0.1600 | n15 = 1.73234 | v15 = 54.7 |
| r28 = 4.6918 | d28 = 1.1821 | n16 = 1.59911 | v16 = 39.2 |
| r29 = −2.9814 | d29 = 2.4000 | | |
| r30 = 63.7345 | d30 = 0.7983 | n17 = 1.48915 | v17 = 70.2 |
| r31 = −3.4322 | d31 = 0.0200 | | |
| r32 = −4.1568 | d32 = 0.2200 | n18 = 1.79013 | v18 = 44.2 |
| r33 = 3.6746 | d33 = 0.6531 | n19 = 1.50349 | v19 = 56.4 |
| r34 = −5.7622 | d34 = 0.1100 | | |
| r35 = −19.4539 | d35 = 0.5937 | n20 = 1.55099 | v20 = 45.8 |
| r36 = −2.6528 | d36 = 0.2200 | n21 = 1.81265 | v21 = 25.4 |
| r37 = −6.0262 | d37 = 0.0200 | | |

-continued

| f = 1 to 44 | fno = 1:1.7 to 3.0 | 2ω = 57.6° to 1.4° | |
|---|---|---|---|
| r38 = 6.7418 | d38 = 0.7030 | n22 = 1.51977 | ν22 = 52.4 |
| r39 = −5.6512 | d39 = 0.5000 | | |
| r40 = ∞ | d40 = 5.0000 | n23 = 1.51825 | ν23 = 64.2 |
| r41 = ∞ | | | |

Focal Length

| variable interval | 1.00 | 6.48 | 44.00 |
|---|---|---|---|
| d 8 | 0.34 | 9.15 | 12.24 |
| d15 | 17.94 | 7.31 | 0.34 |
| d22 | 0.33 | 2.15 | 6.03 |

Aspherical Shape

17th Surface
R=−8.1836 A=0 B=2.248·10$^{-4}$
C=2.823·10$^{-6}$ D=−1.199·10$^{-7}$ E=−2.476·10$^{-8}$
21st surface
R=11.0730 A=0 B=−6.460·10$^{-6}$
C=−2.133·10$^{-7}$ D=−8.350·10$^{-8}$ E=−1.853·10$^{-8}$ Numeral Embodiment 4

| f = 1 to 18.5 | fno = 1:1.54 to 1.85 | 2ω = 74.8° to 4.7° | |
|---|---|---|---|
| r1 = 45.8264 | d1 = 0.6528 | n1 = 1.77621 | ν1 = 49.6 |
| r2 = 12.6882 | d2 = 5.2005 | | |
| r3 = −23.6007 | d3 = 0.6250 | n2 = 1.77621 | ν2 = 49.6 |
| r4 = −188.0964 | d4 = 0.0208 | | |
| r5 = 31.2041 | d5 = 1.4540 | n3 = 1.72311 | ν3 = 29.5 |
| r6 = 87.3082 | d6 = 1.2989 | | |
| r7 = −164.9179 | d7 = 2.0140 | n4 = 1.49845 | ν4 = 81.5 |
| r8 = −21.9184 | d8 = 0.0278 | | |
| r9 = −328.2393 | d9 = 0.6111 | n5 = 1.81265 | ν5 = 25.4 |
| r10 = 32.4918 | d10 = 1.9938 | n6 = 1.49845 | ν6 = 81.5 |
| r11 = −49.6788 | d11 = 4.6873 | | |
| r12 = 122.4153 | d12 = 2.5195 | n7 = 1.49845 | ν7 = 81.5 |
| r13 = −23.5407 | d13 = 0.0208 | | |
| r14 = 27.5327 | d14 = 1.8824 | n8 = 1.49845 | ν8 = 81.5 |
| r15 = −342.7973 | d15 = 0.0208 | | |
| r16 = 16.2862 | d16 = 1.1834 | n9 = 1.62286 | ν9 = 60.3 |
| r17 = 25.6486 | d17 = variable | | |
| *r18 = 11.2637 | d18 = 0.2083 | n10 = 1.88815 | ν10 = 40.8 |
| r19 = 6.0165 | d19 = 0.8647 | | |
| r20 = −59.2052 | d20 = 0.2083 | n11 = 1.77621 | V11 = 49.6 |
| r21 = 15.1451 | d21 = 0.8782 | | |
| r22 = −7.1449 | d22 = 0.2083 | n12 = 1.77621 | ν12 = 49.6 |
| r23 = −130.1985 | d23 = 1.1332 | n13 = 1.81643 | ν13 = 22.8 |
| r24 = −5.7246 | d24 = 0.1212 | | |
| r25 = −5.1946 | d25 = 0.2083 | n14 = 1.82017 | ν14 = 46.6 |
| r26 = −27.5533 | d26 = variable | | |
| r27 = 111.1111 | d27 = 0.8814 | n15 = 1.50014 | ν15 = 65.0 |
| *r28 = −15.6333 | d28 = 0.0278 | | |
| r29 = 43.0926 | d29 = 0.3472 | n16 = 1.65223 | ν16 = 33.8 |
| r30 = 11.9784 | d30 = 1.4619 | n17 = 1.59143 | ν17 = 61.2 |
| r31 = −20.8564 | d31 = 0.0278 | | |
| r32 = 29.0349 | d32 = 1.2777 | n18 = 1.60548 | ν18 = 60.7 |
| r33 = −13.4066 | d33 = 0.3472 | n19 = 1.85501 | ν19 = 23.9 |
| r34 = −29.5167 | d34 = 0.0278 | | |
| *r35 = 19.7407 | d35 = 1.0348 | n20 = 1.48915 | ν20 = 70.2 |
| r36 = −25.4667 | d36 = variable | | |
| r37 = ∞(stop) | d37 = 0.7442 | | |
| r38 = −6.3287 | d38 = 0.2083 | n21 = 1.73234 | ν21 = 54.7 |
| r39 = 5.3739 | d39 = 0.6603 | n22 = 1.85504 | ν22 = 23.8 |
| r40 = 10.1827 | d40 = 0.8639 | | |
| r41 = −4.5526 | d41 = 0.2500 | n23 = 1.75844 | ν23 = 52.3 |
| r42 = −67.1883 | d42 = 1.1601 | n24 = 1.73429 | ν24 = 28.5 |
| r43 = −4.3603 | d43 = 3.1250 | | |
| r44 = −147.8366 | d44 = 0.2500 | n25 = 1.75844 | ν25 = 52.3 |
| r45 = 4.6357 | d45 = 1.5711 | n26 = 1.55098 | ν26 = 45.8 |
| r46 = −7.3254 | d46 = 0.0278 | | |
| r47 = 13.3219 | d47 = 0.2500 | n27 = 1.83932 | ν27 = 37.2 |
| r48 = 4.5049 | d48 = 1.1166 | n28 = 1.48915 | ν28 = 70.2 |
| r49 = −33.1440 | d49 = 0.0278 | | |
| r50 = 21.4663 | d50 = 1.1406 | n29 = 1.49845 | ν29 = 81.5 |
| r51 = −5.0192 | d51 = 0.2500 | n30 = 1.81264 | ν30 = 25.4 |
| r52 = −32.5034 | d52 = 0.0694 | | |
| r53 = 12.0186 | d53 = 1.2148 | n31 = 1.48915 | ν31 = 70.2 |
| r54 = −5.5637 | d54 = 0.6944 | | |
| r55 = ∞ | d55 = 6.9444 | n32 = 1.51825 | ν32 = 64.2 |
| r56 = ∞ | | | |

Focal Length

| variable interval | 1.00 | 4.41 | 18.50 |
|---|---|---|---|
| d17 | 0.72 | 10.45 | 14.65 |
| d26 | 20.79 | 8.86 | 0.73 |
| d36 | 0.30 | 2.51 | 6.44 |

Aspherical Shape

18th Surface
R=11.2637 A=0 B=0
C=1.157·10$^{-5}$ D=−1.003·10$^{-6}$ E=2.183·10$^{-8}$
28th Surface
R=−15.6333 A=0 B=8.805·10$^{-5}$
C=5.928·10$^{-6}$ D=−3.655·10$^{-7}$ E=7.795·10$^{-9}$
35th Surface
R=19.7407 A=0 B=0
C=−6.772·10$^{-7}$ D=−2.508·10$^{-10}$ E=0

Numeral Embodiment 5

| f = 1 to 18.5 | fno = 1:1.54 to 1.85 | 2ω = 74.8° to 4.7° | |
|---|---|---|---|
| r1 = 45.9243 | d1 = 0.6528 | n1 = 1.77621 | ν1 = 49.6 |
| r2 = 14.0645 | d2 = 5.0480 | | |
| r3 = −25.4381 | d3 = 0.6250 | n2 = 1.77621 | ν2 = 49.6 |
| r4 = 2688.8567 | d4 = 0.0208 | | |
| r5 = 34.2280 | d5 = 1.2885 | n3 = 1.72311 | ν3 = 29.5 |
| r6 = 96.0192 | d6 = 1.2292 | | |
| r7 = −183.5350 | d7 = 2.1223 | n4 = 1.49845 | ν4 = 81.5 |
| r8 = −21.9311 | d8 = 0.0278 | | |
| r9 = −226.7499 | d9 = 0.6111 | n5 = 1.81265 | ν5 = 25.4 |
| r10 = 37.5326 | d10 = 1.8860 | n6 = 1.49845 | ν6 = 81.5 |
| r11 = −56.6509 | d11 = 5.0113 | | |
| r12 = 82.3692 | d12 = 2.3719 | n7 = 1.49845 | ν7 = 81.5 |
| r13 = −25.2551 | d13 = 0.0208 | | |
| r14 = 28.2477 | d14 = 1.7269 | n8 = 1.49845 | ν8 = 81.5 |
| r15 = −596.9330 | d15 = 0.0208 | | |
| r16 = 16.3670 | d16 = 1.1995 | n9 = 1.62286 | ν9 = 60.3 |
| r17 = 24.7320 | d17 = variable | | |
| r18 = 12.1265 | d18 = 0.2083 | n10 = 1.88815 | ν10 = 40.8 |
| r19 = 6.5623 | d19 = 0.8078 | | |
| r20 = −33.3281 | d20 = 0.2083 | n11 = 1.77621 | ν11 = 49.6 |
| r21 = 16.5485 | d21 = 0.8908 | | |
| r22 = −7.1723 | d22 = 0.2083 | n12 = 1.77621 | ν12 = 49.6 |
| r23 = −84.4939 | d23 = 1.1282 | n13 = 1.81643 | ν13 = 22.8 |

-continued

| f = 1 to 18.5 | fno = 1:1.54 to 1.85 | | 2ω = 74.8° to 4.7° |
|---|---|---|---|
| r24 = −5.4494 | d24 = 0.0938 | | |
| r25 = −5.1180 | d25 = 0.2083 | n14 = 1.82017 | ν14 = 46.6 |
| r26 = −34.9377 | d26 = variable | | |
| r27 = −105.2966 | d27 = 0.7315 | n15 = 1.62287 | ν15 = 60.3 |
| *r28 = −13.5994 | d28 = 0.0278 | | |
| r29 = 54.7497 | d29 = 0.3472 | n16 = 1.65223 | ν16 = 33.8 |
| r30 = 8.3181 | d30 = 1.7793 | n17 = 1.59143 | ν17 = 61.2 |
| r31 = −21.6110 | d31 = 0.0278 | | |
| r32 = 26.2645 | d32 = 1.2422 | n18 = 1.60548 | ν18 = 60.7 |
| r33 = −13.8744 | d33 = 0.3482 | n19 = 1.85501 | ν19 = 23.9 |
| r34 = −36.3407 | d34 = 0.0278 | | |
| r35 = 18.6093 | d35 = 1.0804 | n20 = 1.62032 | ν20 = 63.4 |
| r36 = −21.5963 | d36 = variable | | |
| r37 = ∞(stop) | d37 = 0.4442 | | |
| r38 = −7.9270 | d38 = 0.2083 | n21 = 1.73234 | ν21 = 54.7 |
| r39 = 4.8729 | d39 = 0.5829 | n22 = 1.85504 | ν22 = 23.8 |
| r40 = 9.8342 | d40 = 0.8534 | | |
| r41 = −4.6154 | d41 = 0.2500 | n23 = 1.75844 | ν23 = 52.3 |
| r42 = 17.2111 | d42 = 1.2241 | n24 = 1.73429 | ν24 = 28.5 |
| r43 = −4.8554 | d43 = 3.1250 | | |
| r44 = −24.5683 | d44 = 0.2500 | n25 = 1.75844 | ν25 = 52.3 |
| r45 = 4.3724 | d45 = 1.4629 | n26 = 1.55098 | ν26 = 45.8 |
| r46 = −6.0628 | d46 = 0.0278 | | |
| r47 = 17.1779 | d47 = 0.2500 | n27 = 1.83932 | ν27 = 37.2 |
| r48 = 4.2602 | d48 = 1.1060 | n28 = 1.48915 | ν28 = 70.2 |
| r49 = −22.5184 | d49 = 0.0278 | | |
| r50 = 17.9182 | d50 = 1.1574 | n29 = 1.49845 | ν29 = 81.5 |
| r51 = −4.5914 | d51 = 0.2500 | n30 = 1.81264 | ν30 = 25.4 |
| r52 = −20.9320 | d52 = 0.0694 | | |
| r53 = 12.4418 | d53 = 1.1936 | n31 = 1.48915 | ν31 = 70.2 |
| r54 = −5.1665 | d54 = 0.6944 | | |
| r55 = ∞ | d55 = 6.9444 | n32 = 1.51825 | ν32 = 64.2 |
| r56 = ∞ | | | |

Focal Length

| variable interval | 1.00 | 4.35 | 18.50 |
|---|---|---|---|
| d17 | 0.79 | 11.07 | 15.67 |
| d26 | 20.88 | 8.70 | 0.61 |
| d36 | 0.30 | 2.20 | 5.69 |

Aspherical Shape

28th Surface

R=−13.5994 A=0 B=8.279·10$^{-5}$

C=5.365·10$^{-6}$ D=−3.692·10$^{-7}$ E=1.091·10$^{-8}$

Numeral Embodiment 6

| f = 1 to 18.5 | fno = 1:1.54 to 1.85 | | 2ω = 74.8° to 4.7° |
|---|---|---|---|
| r1 = .38.0846 | d1 = 0.6528 | n1 = 1.77621 | ν1 = 49.6 |
| r2 = 12.9040 | d2 = 4.4900 | | |
| r3 = −22.9321 | d3 = 0.6250 | n2 = 1.77621 | ν2 = 49.6 |
| r4 = −345.3842 | d4 = 0.0208 | | |
| r5 = 29.3912 | d5 = 1.2107 | n3 = 1.72311 | ν3 = 29.5 |
| r6 = 47.0209 | d6 = 1.5715 | | |
| r7 = −132.6017 | d7 = 1.7122 | n4 = 1.49845 | ν4 = 81.5 |
| r8 = −22.7067 | d8 = 0.0278 | | |
| r9 = −81.7732 | d9 = 0.6111 | n5 = 1.81265 | ν5 = 25.4 |
| r10 = 46.6166 | d10 = 2.0418 | n6 = 1.49845 | ν6 = 81.5 |
| r11 = −33.2733 | d11 = 4.5282 | | |
| r12 = 107.4889 | d12 = 2.7698 | n7 = 1.49845 | ν7 = 81.5 |
| r13 = −21.5806 | d13 = 0.0208 | | |
| r14 = 30.1592 | d14 = 1.7936 | n8 = 1.49845 | ν8 = 81.5 |
| r15 = −282.9218 | d15 = 0.0208 | | |

-continued

| f = 1 to 18.5 | fno = 1:1.54 to 1.85 | | 2ω = 74.8° to 4.7° |
|---|---|---|---|
| r16 = 16.8622 | d16 = 1.4491 | n9 = 1.62286 | ν9 = 60.3 |
| r17 = 35.7872 | d17 = variable | | |
| r18 = 14.8620 | d18 = 0.2083 | n10 = 1.88815 | ν10 = 40.8 |
| r19 = 6.0181 | d19 = 0.7879 | | |
| r20 = 457.3543 | d20 = 0.2083 | n11 = 1.77621 | ν11 = 49.6 |
| r21 = 14.5054 | d21 = 0.9679 | | |
| r22 = −6.8099 | d22 = 0.2083 | n12 = 1.77621 | ν12 = 49.6 |
| r23 = −83.2980 | d23 = 1.1695 | n13 = 1.81643 | ν13 = 22.8 |
| r24 = −5.6115 | d24 = 0.0887 | | |
| r25 = −5.3356 | d25 = 0.2083 | n14 = 1.82017 | ν14 = 46.6 |
| r26 = −24.2390 | d26 = variable | | |
| *r27 = 122.0833 | d27 = 1.0113 | n15 = 1.50014 | ν15 = 65.0 |
| r28 = −16.4697 | d28 = 0.0278 | | |
| r29 = 52.0381 | d29 = 0.3472 | n16 = 1.65223 | ν16 = 33.8 |
| r30 = 11.7912 | d30 = 1.6735 | n17 = 1.59143 | ν17 = 61.2 |
| r31 = −21.0807 | d31 = 0.0278 | | |
| r32 = 25.2138 | d32 = 1.3702 | n18 = 1.60548 | ν18 = 60.7 |
| r33 = −14.1035 | d33 = 0.3472 | n19 = 1.85501 | ν19 = 23.9 |
| r34 = −43.4461 | d34 = 0.0278 | | |
| r35 = 20.5894 | d35 = 1.1228 | n20 = 1.48915 | ν20 = 70.2 |
| r36 = −22.9760 | d36 = variable | | |
| r37 = ∞(stop) | d37 = 0.5039 | | |
| r38 = −7.6277 | d38 = 0.2083 | n21 = 1.73234 | ν21 = 54.7 |
| r39 = 5.5096 | d39 = 0.5761 | n22 = 1.85504 | ν22 = 23.8 |
| r40 = 14.3406 | d40 = 0.8042 | | |
| r41 = −5.4519 | d41 = 0.2500 | n23 = 1.75844 | ν23 = 52.3 |
| r42 = 15.0651 | d42 = 1.2105 | n24 = 1.73429 | ν24 = 28.5 |
| r43 = −5.4604 | d43 = 3.1250 | | |
| r44 = −78.3771 | d44 = 0.2500 | n25 = 1.75844 | ν25 = 52.3 |
| r45 = 4.4416 | d45 = 1.5607 | n26 = 1.55098 | ν26 = 45.8 |
| r46 = −6.4974 | d46 = 0.0278 | | |
| r47 = 15.2730 | d47 = 0.2500 | n27 = 1.83932 | ν27 = 37.2 |
| r48 = 4.2930 | d48 = 1.1380 | n28 = 1.48915 | ν28 = 70.2 |
| r49 = −26.0421 | d49 = 0.0278 | | |
| r50 = 18.7094 | d50 = 1.1796 | n29 = 1.49845 | ν29 = 81.5 |
| r51 = −4.5199 | d51 = 0.2500 | n30 = 1.81264 | .ν30 = 25.4 |
| r52 = −31.6856 | d52 = 0.0694 | | |
| r53 = 13.0447 | d53 = 1.2114 | n31 = 1.48915 | ν31 = 70.2 |
| r54 = −5.1826 | d54 = 0.6944 | | |
| r55 = ∞ | d55 = 6.9444 | n32 = 1.51825 | ν32 = 64.2 |
| r56 = ∞ | | | |

Focal Length

| variable interval | 1.00 | 4.31 | 18.50 |
|---|---|---|---|
| d17 | 0.40 | 9.47 | 13.47 |
| d26 | 20.29 | 8.76 | 0.31 |
| d36 | 0.30 | 2.76 | 7.21 |

Aspherical Shape

27th Surface

R=122.0833 A=0 B=−8.285·10$^{-5}$

C=−4.987·10$^{-6}$ D=3.731·10$^{-7}$ E=−1.049·10$^{-8}$

Numeral Embodiment 7

| f = 1 to 44 | fno = 1:1.75 to 3.0 | | 2ω = 54.6° to 1.4° |
|---|---|---|---|
| r1 = 37.7306 | d1 = 0.5500 | n1 = 1.72311 | ν1 = 29.5 |
| r2 = 17.7964 | d2 = 0.0464 | | |
| r3 = 17.6001 | d3 = 2.2326 | n2 = 1.43496 | ν2 = 95.1 |
| r4 = −64.0388 | d4 = 0.0300 | | |
| r5 = 17.4550 | d5 = 1.7977 | n3 = 1.43496 | ν3 = 95.1 |
| r6 = −4776.2793 | d6 = 0.0300 | | |
| r7 = 12.9299 | d7 = 1.3001 | n4 = 1.49845 | ν4 = 81.6 |
| r8 = 29.3265 | d8 = variable | | |
| r9 = 57.1775 | d9 = 0.2000 | n5 = 1.82017 | ν5 = 46.6 |

-continued

| f = 1 to 44 | fno = 1:1.75 to 3.0 | | 2ω = 54.6° to 1.4° |
|---|---|---|---|
| r10 = 5.0465 | d10 = 0.7073 | | |
| r11 = −9.3967 | d11 = 0.1800 | n6 = 1.77621 | v6 = 49.6 |
| r12 = 7.4009 | d12 = 0.4939 | | |
| r13 = −6.4079 | d13 = 0.1800 | n7 = 1.82017 | v7 = 46.6 |
| r14 = 5.4362 | d14 = 0.5866 | n8 = 1.93306 | v8 = 21.3 |
| r15 = −23.6964 | d15 = variable | | |
| r16 = 62.7719 | d16 = 0.5814 | n9 = 1.50014 | v9 = 65.0 |
| *r17 = −10.0563 | d17 = 0.0300 | | |
| r18 = 17.2321 | d18 = 0.2500 | n10 = 1.65223 | v10 = 33.8 |
| r19 = 8.4806 | d19 = 0.9016 | n11 = 1.49845 | V11 = 81.6 |
| r20 = −14.4782 | d20 = 0.0200 | | |
| r21 = 17.4955 | d21 = 0.8900 | n12 = 1.45720 | v12 = 90.3 |
| r22 = −9.0888 | d22 = 0.2500 | n13 = 1.85501 | v13 = 23.9 |
| r23 = −17.4327 | d23 = 0.0200 | | |
| r24 = 30.0842 | d24 = 0.7653 | n14 = 1.48915 | v14 = 70.2 |
| r25 = −10.2082 | d25 = variable | | |
| r26 = ∞(stop) | d26 = 0.3003 | | |
| r27 = −5.6276 | d27 = 0.1800 | n15 = 1.79013 | v15 = 44.2 |
| r28 = 4.0682 | d28 = 0.5255 | n16 = 1.81265 | v16 = 25.4 |
| r29 = 29.9636 | d29 = 0.5552 | | |
| r30 = −4.1276 | d30 = 0.1600 | n17 = 1.73234 | v17 = 54.7 |
| r31 = 3.9188 | d31 = 1.1252 | n18 = 1.59911 | v18 = 39.2 |
| r32 = −3.1709 | d32 = 2.4000 | | |
| r33 = −42.9754 | d33 = 0.7555 | n19 = 1.48915 | v19 = 70.2 |
| r34 = −3.3839 | d34 = 0.0200 | | |
| r35 = −4.7620 | d35 = 0.2200 | n20 = 1.79013 | v20 = 44.2 |
| r36 = 3.7898 | d36 = 0.7084 | n21 = 1.50349 | v21 = 56.4 |
| r37 = −5.7990 | d37 = 0.1100 | | |
| r38 = −27.8346 | d38 = 0.6393 | n22 = 1.55099 | v22 = 45.8 |
| r39 = −2.4633 | d39 = 0.2200 | n23 = 1.81265 | v23 = 25.4 |
| r40 = −6.0843 | d40 = 0.0200 | | |
| r41 = 6.2580 | d41 = 0.6308 | n24 = 1.51977 | v24 = 52.4 |
| r42 = −5.9488 | d42 = 0.5000 | | |
| r43 = ∞ | d43 = 5.0000 | n25 = 1.51825 | v25 = 64.2 |
| r44 = ∞ | | | |

Focal Length

| variable interval | 1.00 | 6.64 | 44.00 |
|---|---|---|---|
| d 8 | 0.31 | 8.66 | 11.48 |
| d15 | 17.47 | 7.16 | 0.30 |
| d25 | 0.33 | 2.30 | 6.34 |

Aspherical Shape
17th Surface
R=−10.0563 A=0 B=6.087·10$^{-4}$
C=1.467·10$^{-5}$ D=−1.827·10$^{-7}$ E=2.015·10$^{-8}$ Numeral Embodiment 8

| f = 1 to 50 | fno = 1:1.75 to 3.0 | | 2ω = 54.6° to 1.3° |
|---|---|---|---|
| r1 = 45.1143 | d1 = 0.5500 | n1 = 1.72311 | v1 = 29.5 |
| r2 = 20.8674 | d2 = 0.1589 | | |
| r3 = 20.5864 | d3 = 3.2354 | n2 = 1.43496 | v2 = 95.1 |
| r4 = −66.6973 | d4 = 0.0300 | | |
| r5 = 22.3339 | d5 = 2.0925 | n3 = 1.43496 | v3 = 95.1 |
| r6 = 430.2882 | d6 = 0.0300 | | |
| r7 = 15.0782 | d7 = 1.9079 | n4 = 1.49845 | v4 = 81.6 |
| r8 = 38.7938 | d8 = variable | | |
| r9 = 33.3548 | d9 = 0.2000 | n5 = 1.82017 | v5 = 46.6 |
| r10 = 5.7436 | d10 = 0.6190 | | |
| r11 = −14.8253 | d11 = 0.1800 | n6 = 1.77621 | v6 = 49.6 |
| r12 = 5.4625 | d12 = 0.8729 | | |
| r13 = −5.3937 | d13 = 0.1800 | n7 = 1.82017 | v7 = 46.6 |
| r14 = 5.7486 | d14 = 0.9282 | n8 = 1.93306 | v8 = 21.3 |
| r15 = −21.4529 | d15 = variable | | |

-continued

| f = 1 to 50 | fno = 1:1.75 to 3.0 | | 2ω = 54.6° to 1.3° |
|---|---|---|---|
| r16 = 211.8961 | d16 = 0.8526 | n9 = 1.50014 | v9 = 65.0 |
| *r17 = −8.0328 | d17 = 0.0300 | | |
| r18 = 14.5592 | d18 = 0.2500 | n10 = 1.65223 | v10 = 33.8 |
| r19 = 6.2661 | d19 = 1.6752 | n11 = 1.49845 | v11 = 81.6 |
| r20 = −15.1961 | d20 = 0.0200 | | |
| r21 = 12.1178 | d21 = 1.2133 | n12 = 1.45720 | v12 = 90.3 |
| r22 = −12.7729 | d22 = 0.2500 | n13 = 1.85501 | v13 = 23.9 |
| r23 = −29.2539 | d23 = 0.0200 | | |
| *r24 = 23.7180 | d24 = 0.9740 | n14 = 1.48915 | v14 = 70.2 |
| r25 = −11.5841 | d25 = variable | | |
| r26 = ∞(stop) | d26 = 0.2787 | | |
| r27 = −5.4190 | d27 = 0.1800 | n15 = 1.79013 | v15 = 44.2 |
| r28 = 3.1625 | d28 = 0.5700 | n16 = 1.81265 | v16 = 25.4 |
| r29 = 13.9958 | d29 = 0.5775 | | |
| r30 = −3.2033 | d30 = 0.1600 | n17 = 1.73234 | v17 = 54.7 |
| r31 = 3.8274 | d31 = 1.3634 | n18 = 1.59911 | v18 = 39.2 |
| r32 = −2.8825 | d32 = 2.4000 | | |
| r33 = 18.3837 | d33 = 0.2000 | n19 = 1.77621 | v19 = 49.6 |
| r34 = 7.1717 | d34 = 0.9324 | n20 = 1.48915 | v20 = 70.2 |
| r35 = −3.2778 | d35 = 0.0200 | | |
| r36 = −4.1362 | d36 = 0.2000 | n21 = 1.79013 | v21 = 44.2 |
| r37 = 5.3049 | d37 = 0.6558 | n22 = 1.50349 | v22 = 56.4 |
| r38 = −4.6150 | d38 = 0.1100 | | |
| r39 = −107.7625 | d39 = 0.6628 | n23 = 1.55099 | v23 = 45.8 |
| r40 = −2.7638 | d40 = 0.2000 | | |
| r41 = −6.5763 | d41 = 0.0200 | | |
| r42 = 9.2058 | d42 = 0.5358 | n25 = 1.51977 | v25 = 52.4 |
| r43 = −7.4479 | d43 = 0.5000 | | |
| r44 = ∞ | d44 = 5.0000 | n26 = 1.51825 | v26 = 64.2 |
| r45 = ∞ | | | |

Focal Length

| variable interval | 1.00 | 7.11 | 50.00 |
|---|---|---|---|
| d 8 | 0.27 | 10.52 | 13.88 |
| d15 | 19.37 | 7.30 | 0.15 |
| d25 | 0.33 | 2.15 | 5.94 |

Aspherical Shape
17th Surface
R=−8.0328 A=0 B=4.466·10$^{-4}$
C=4.166 10$^{-6}$ D=6.631·10$^{-7}$ E=−2.89·10$^{-8}$
24th Surface
R=23.7180 A=0 B=−2.876·10$^{-4}$
C=−3.022·10$^{-7}$ D=−2.319·10$^{-7}$ E=6.130·10$^{-9}$ The following are the numerical values set in the conditions in the respective embodiments.

| | Embodiments | | | | | | | |
|---|---|---|---|---|---|---|---|---|
| Condition | 1 | 2 | 3 | 4 | 5 | 6 | 7 | 8 |
| (3) | 0.89 | 0.84 | 0.83 | 0.88 | 0.85 | 0.92 | 0.99 | 0.77 |
| (4) | 1.55 | 1.55 | 1.55 | 1.55 | 1.61 | 1.55 | 1.49 | 1.49 |
| (5) | 64.3 | 64.3 | 66.8 | 64.3 | 61.4 | 64.3 | 76.8 | 76.8 |
| (6) | 2.27 | 2.09 | 2.09 | 2.27 | 2.76 | 1.89 | 1.86 | 2.43 |
| (7) | 0.72 | 0.61 | 0.61 | 0.72 | 0.74 | 0.71 | 0.60 | 0.57 |

According to the zoom lens of the present invention, in a so-called 4-unit zoom lens, aspherical surfaces having appropriate shapes are provided for a third lens unit for correcting variations in image surface upon a zooming operation and a second lens unit for a zooming operation, and refracting powers and the like are properly set for the respective lens units, thereby reducing variations in halo/ coma accompanying the zooming operation. In addition, variations in spherical aberration, astigmatism, and the like can be properly corrected, and high optical performance throughout the entire zoom range, an f-number of about 1.5 to 1.8 at the wide-angle end, and a large aperture with a high zoom ratio of about 18 to 50 can be attained.

What is claimed is:

1. A zoom lens comprising a first lens unit having a positive refracting power and being fixed during zooming, a second lens unit having a negative refracting power and being movable during zooming, a third lens unit having a positive refracting power and used to correct image surface by the zooming, and a fourth lens unit having a positive refracting power, said lens units being sequentially arranged from an object side, wherein an intermediate focal length fm is given by $$fm = fw \cdot z^{1/2}$$

where fw is a wide-angle focal length, and z is a zoom ratio, and an aspherical surface shaped to decrease a positive refracting power or increase a negative refracting power is provided at a lens surface of said third lens unit which satisfies $$1 \leq |h3'/h3|$$

where h3 is a height at which an on-axial marginal ray passes, and h3' is a height at which an off-axial marginal ray that is formed into an image at a maximum image height passes, at this intermediate focal length fm.

2. A lens according to claim 1, wherein said third lens unit is made up of at least three convex lenses and at least one concave lens, and satisfies $$0.5 \leq f3/D3 \leq 1.5$$

$$1.45 \leq n3 \leq 1.65$$

$$55 \leq \nu 3 \leq 85$$

where f3 is a focal length of said third lens unit, D3 is a maximum aperture, n3 is an average refractive index of the convex lenses, and ν3 is an average Abbe's number of the convex lenses.

3. A lens according to claim 1, wherein said second and third lens units move in directions to decrease an interval therebetween in magnifying operation from the wide-angle end to the telephoto end, and satisfy $$1.6 \leq m2/m3 \leq 3.0$$

$$0.3 \leq \beta 2/\beta 3 \leq 1.2$$

where m2 and m3 are total moving amounts of said second and third lens units, and β2 and β3 are lateral magnifications at the wide-angle end.

4. A lens according to claim 1, wherein said second lens unit includes at least one aspherical surface shaped to gradually decrease a concave refracting power toward a peripheral portion.

5. A lens according to claim 1, wherein said second and third lens units simultaneously pass through the point where imaging magnifications of said second and third lens units is −1-time during zooming from the wide-angle end to the telephoto end.

* * * * *

UNITED STATES PATENT AND TRADEMARK OFFICE
CERTIFICATE OF CORRECTION

PATENT NO. : 6,282,032 B1
DATED : August 28, 2001
INVENTOR(S) : Yasuyuki Tomita

It is certified that error appears in the above-identified patent and that said Letters Patent is hereby corrected as shown below:

<u>Title page,</u>
Item [57], ABSTRACT,
Line 14, "through" should read -- through a --.

<u>Column 1,</u>
Line 58, "and a" should read -- and the --.

<u>Column 2,</u>
Line 17, "in the" should read -- in a --.
Line 42, "make" should read -- makes --.
Line 51, "variations" should read -- variations in --.

<u>Column 3,</u>
Line 58, "ninth" should read -- eighth --.

<u>Column 12,</u>
Line 40, "$^E=0$" should read -- E=0 --.

<u>Column 17,</u>
Line 25, "$\leq$" should read -- < --.

Signed and Sealed this

Fifth Day of August, 2003

JAMES E. ROGAN
*Director of the United States Patent and Trademark Office*